US012748702B2

(12) United States Patent
Armangau et al.

(10) Patent No.: US 12,748,702 B2
(45) Date of Patent: Sep. 29, 2026

(54) UTILIZING A LOCK MANAGER FOR A CLUSTER-LEVEL WRITE BACK CACHE

(71) Applicant: Dell Products L.P., Round Rock, TX (US)

(72) Inventors: Philippe Armangau, Kalispell, MT (US); Max Laier, Seattle, WA (US); Arthur Lent, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/988,775

(22) Filed: Dec. 19, 2024

(65) Prior Publication Data

US 2026/0178496 A1 Jun. 25, 2026

(51) Int. Cl.

| | |
|---|---|
| ***G06F 12/08*** | (2016.01) |
| ***G06F 12/00*** | (2006.01) |
| ***G06F 12/0815*** | (2016.01) |
| ***G06F 16/00*** | (2019.01) |
| ***H04L 67/10*** | (2022.01) |

(52) U.S. Cl.

CPC .......... *G06F 12/0815* (2013.01); *G06F 12/00* (2013.01); *G06F 16/00* (2019.01); *H04L 67/10* (2013.01)

(58) Field of Classification Search

CPC ...... G06F 12/0815; G06F 16/00; G06F 12/00; H04L 67/10

See application file for complete search history.

(56) References Cited

U.S. PATENT DOCUMENTS 7,797,275 B2 * 9/2010 Lee ..................... G06F 12/0804 707/704
9,424,189 B1 * 8/2016 Patil .................... G06F 12/0804
9,684,594 B2 * 6/2017 Vekiarides .......... G06F 12/0897
2003/0018785 A1 * 1/2003 Eshel .................... H04L 12/417 709/226
2007/0174541 A1 * 7/2007 Chandrasekaran .......................... G06F 12/0866 711/E12.027

* cited by examiner

*Primary Examiner* — Masud K Khan

(74) *Attorney, Agent, or Firm* — Amin, Turocy & Watson, LLP

(57) ABSTRACT

A system can maintain a filesystem across nodes of a cluster. The system can, based on receiving a first request from a first node to ingest or write data to a location on a second node, issue, by a lock manager, a write lock on the location of the second node. The system can, based on the first node receiving the write lock, write, by the first node, the data to a write back cache of the first node while refraining from writing the data to the location on the second node. The system can, before the first node flushes the write back cache, comprising writing the data to the location of the second node, respond, by the lock manager, to a second request to read the location on the second node with a read lock that indicates reading the data in the write back cache on the first node.

13 Claims, 13 Drawing Sheets

1200

UTILIZING A LOCK MANAGER FOR A CLUSTER-LEVEL WRITE BACK CACHE

BACKGROUND

A computer system can store computer data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a filesystem across nodes of a cluster, where respective nodes of the nodes are configured to read and write on any other node of the nodes. The system can, based on receiving a first request from a first node of the nodes to ingest data or to write the data to a location on a second node of the nodes, issue, by a lock manager and to the first node, a write lock on the location of the second node. The system can, based on the first node receiving the write lock, write, by the first node, the data to a write back cache of the first node while refraining from writing the data to the location on the second node. The system can, before the first node flushes the write back cache, comprising writing the data to the location of the second node, respond, by the lock manager, to a second request to read the location on the second node with a read lock that indicates reading the data in the write back cache on the first node.

An example method can comprise, based on receiving, by a lock manager of system comprising at least one processor, a first request from a first node of a cluster filesystem to ingest data or to write the data to a location on a second node of the cluster filesystem, issuing, to the first node, a write lock on the location of the second node. The method can further comprise, based on the first node receiving the write lock, writing, by the first node, the data to a write back cache of the first node while refraining from writing the data to the location on the second node. The method can further comprise, before the first node flushes the write back cache, comprising writing the data to the location of the second node, responding, by the lock manager, to a second request to read the location on the second node with a read lock that indicates reading the data in the write back cache on the first node.

An example non-transitory computer-readable medium can comprise instructions that, in response to execution, cause a system comprising a processor to perform operations. These operations can comprise, based on receiving, by a lock manager of a cluster filesystem, a first request from a first node of the cluster filesystem to ingest data or to write the data to a location on a second node of the cluster filesystem, issuing, to the first node, a write lock on the location. These operations can further comprise, based on the first node receiving the write lock, writing, by the first node, the data to a write back cache. These operations can further comprise, before the first node flushes the write back cache, responding, by the lock manager, to a second request to read the location on the second node with a read lock that indicates reading the data in the write back cache.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

A write back cache can comprise a cache that is used to cache writes above a mapping layer of a filesystem. A write back cache can be challenging to implement in a large cluster system because writes and reads can happen from any node. Some prior approaches use sharding of the address space algorithms. These can be simply, but require "redirecting read and write" to the node in charge of the sub-set of the address space. Some prior approaches duplicate writes across notes, but it can be that this does not scale much. In both cases, the network traffic can be high. The present techniques can be directed to facilitating a write back cache on an ingested node location, and reading from any nodes with a reduced network traffic compared to prior approaches.

The present techniques can be implemented by leveraging a file lock manager of a filesystem to distribute a write back cache across nodes, and to track dirty file range locations. When data is written on a node, an offset/length write range lock can be acquired via the lock manager. The lock manager can keep track of the node that holds the write range lock for this file/offset.

The present techniques can leverage protocol to track the write back cache node location of the write back cache at the same time until the write back cache is flushed. Until then, it can be that any read to the same file/offset can first acquire a read lock, and as such the lock manager can provide, with the read lock acknowledgment (ack), the node location of the dirty data. Moreover, if another node wants to write to the same location, the lock manager that can revoke the write lock can also keep the newest location of the write back cache. In the former case, a flush of the write back cache can first obtain a write lock, as well, to flush the dirty data blocks. To achieve consistency of the data after flush, the lock manager can allow or reject (with an obsolete status) the lock request, so that the latest version of the data only can be flushed to persistent storage.

According to the present techniques, a write back cache can be distributed to a node that is ingesting new writes for files, avoiding redirection and reducing network traffic by leveraging the existing lock manager to synchronize write/read and flush for the data blocks.

Example Architectures

Figure 1:
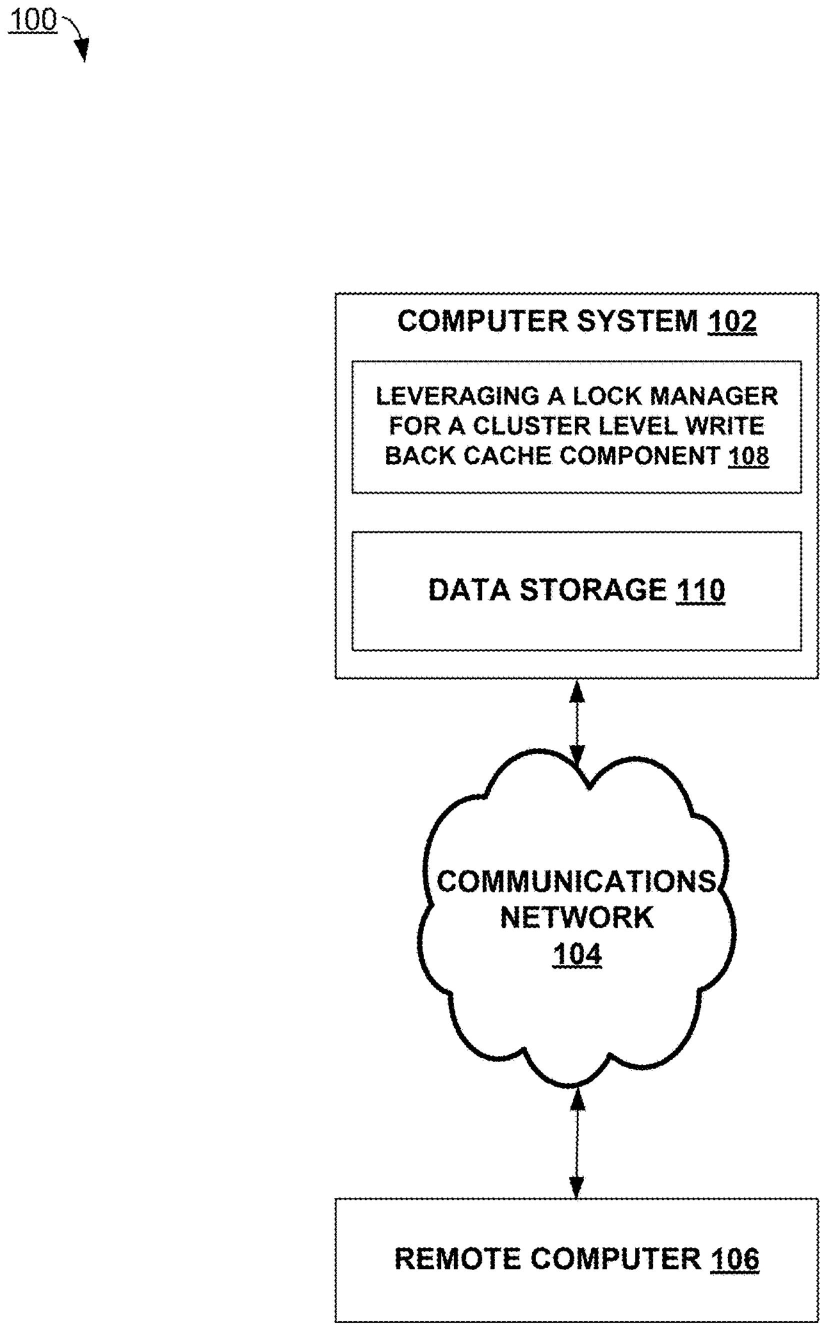
FIG. 1 illustrates an example system architecture that can facilitate utilizing a lock manager for a cluster-level write back cache, in accordance with an embodiment of this disclosure.

FIG. 1 illustrates an example system architecture 100 that can facilitate utilizing a lock manager for a cluster-level write back cache, in accordance with an embodiment of this disclosure.

System architecture 100 comprises computer system 102, communications network 104, and remote computer 106. In turn, computer system 102 comprises utilizing a lock manager for a cluster-level write back cache component 108, and data storage 110.

Figure 13:
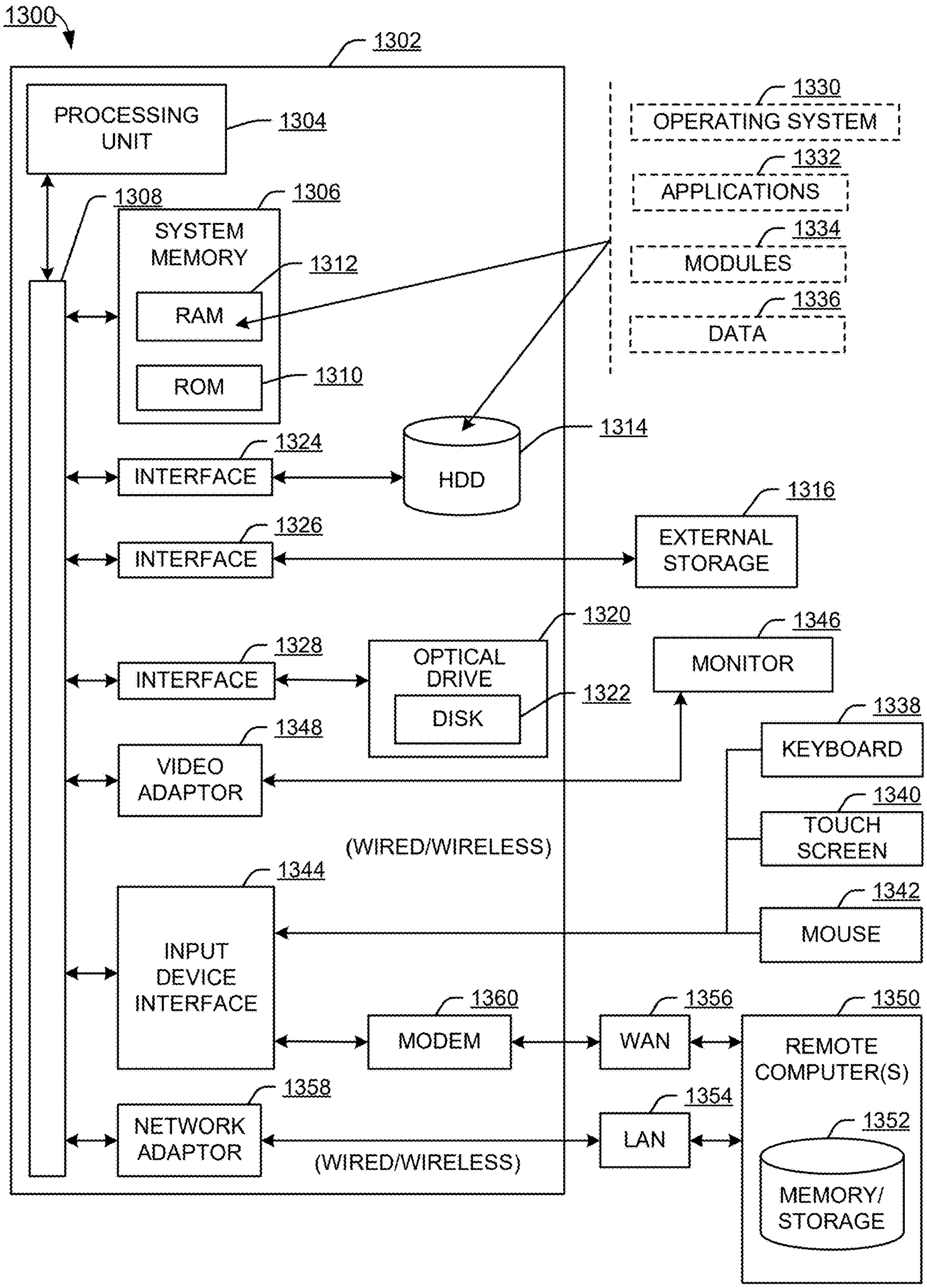
FIG. 13 illustrates an example block diagram of a computer operable to execute an embodiment of this disclosure.

Each of computer system 102 and/or remote computer 106 can be implemented with part(s) of computing environment 1300 of FIG. 13. Communications network 104 can comprise a computer communications network, such as the Internet.

Computer system 102 can store computer data in data storage 110, and make that available to read and/or write by remote computer 106 via communications network 104. The data in data storage 110 can be stored across multiple nodes, where computer system 102 comprises a cluster filesystem. It can be that any node of the nodes can read from and write to any other node of the nodes.

To facilitate this, each node can maintain a write back cache. Then, utilizing a lock manager for a cluster-level write back cache component 108 can leverage a lock manager (that is configured to issue locks that permit a particular node to read from or write to a particular address space of another node, or the node itself) to facilitate each node using its own write back cache, which can effectuate a system-wide write back cache.

Utilizing a lock manager for a cluster-level write back cache component 108 can maintain a location of currently valid data for a given part of an address space (that is, the data in that address space itself can be valid, or it can be that un-flushed data in a write back cache is valid for that part of the address space), and can direct read requests to where the valid data is.

Figure 10:
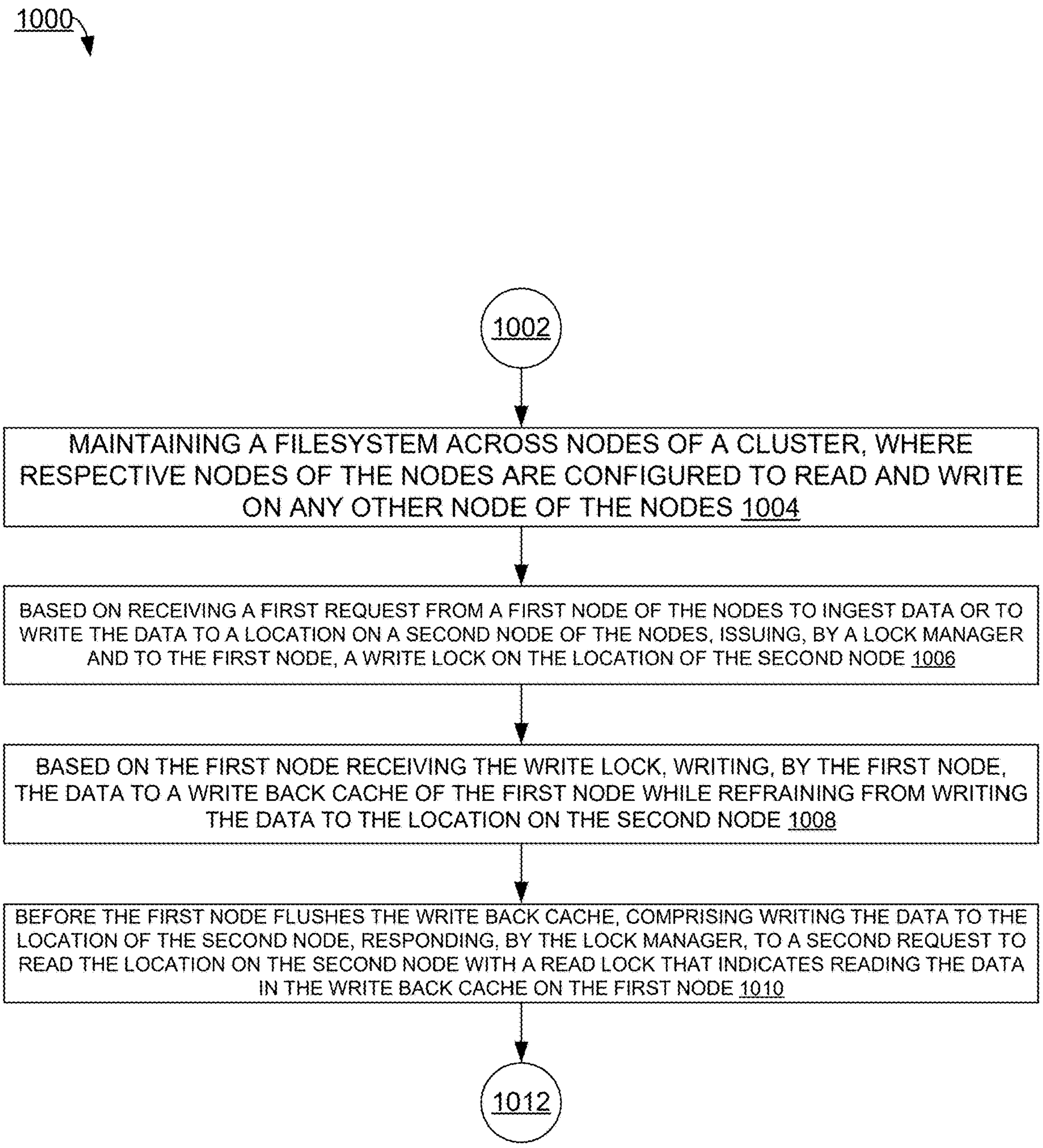
FIG. 10 illustrates an example process flow that can facilitate utilizing a lock manager for a cluster-level write back cache, in accordance with an embodiment of this disclosure.
Figure 11:
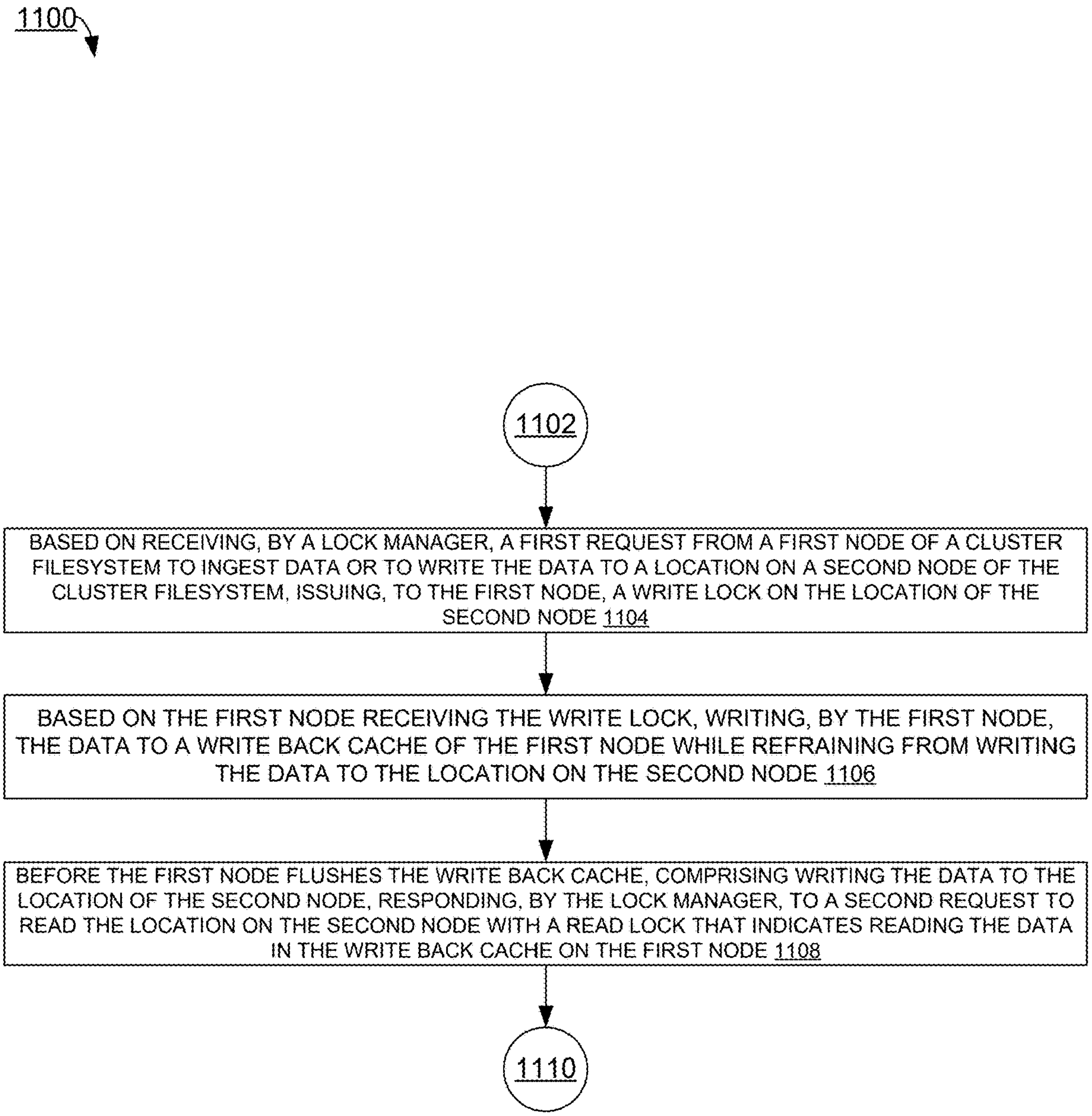
FIG. 11 illustrates another example process flow that can facilitate utilizing a lock manager for a cluster-level write back cache, in accordance with an embodiment of this disclosure.
Figure 12:
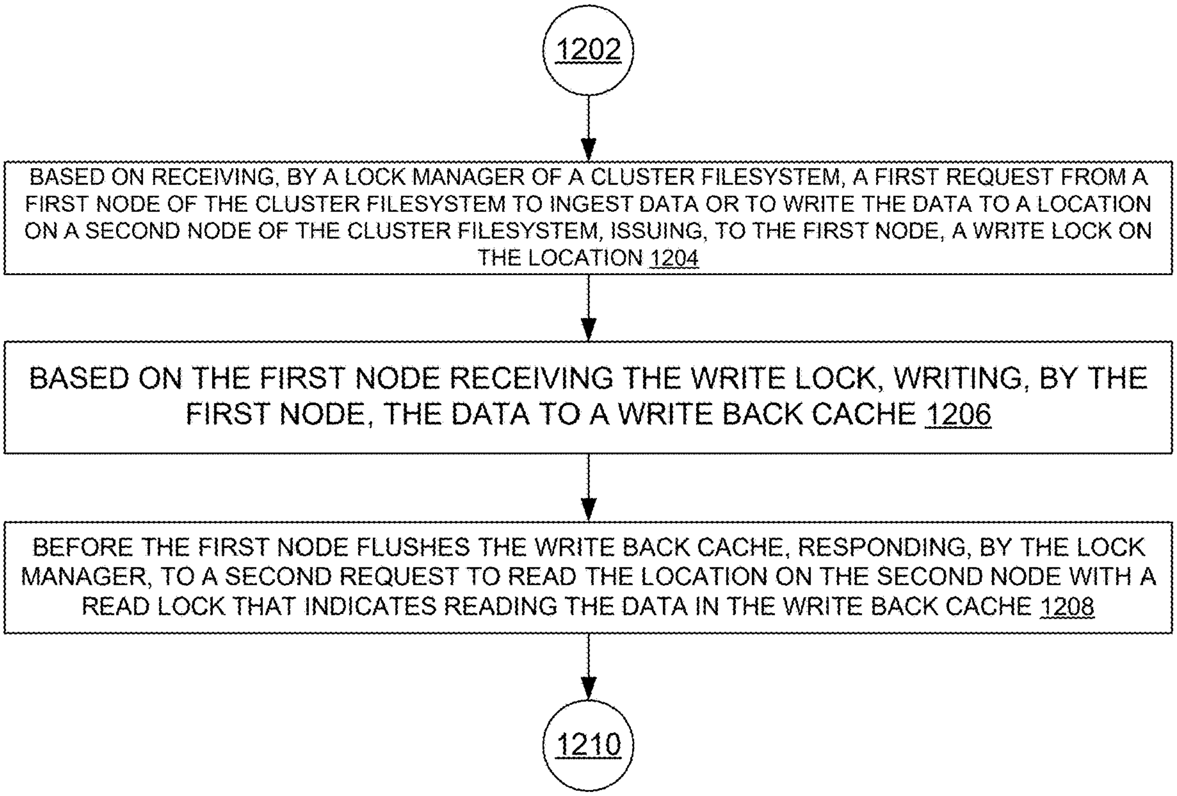
FIG. 12 illustrates another example process flow that can facilitate utilizing a lock manager for a cluster-level write back cache, in accordance with an embodiment of this disclosure.

In some examples, utilizing a lock manager for a cluster-level write back cache component 108 can implement part(s) of the process flows of FIGS. 10-12 to implement utilizing a lock manager for a cluster-level write back cache.

It can be appreciated that system architecture 100 is one example system architecture for utilizing a lock manager for a cluster-level write back cache, and that there can be other system architectures that facilitate utilizing a lock manager for a cluster-level write back cache.

Figure 2:
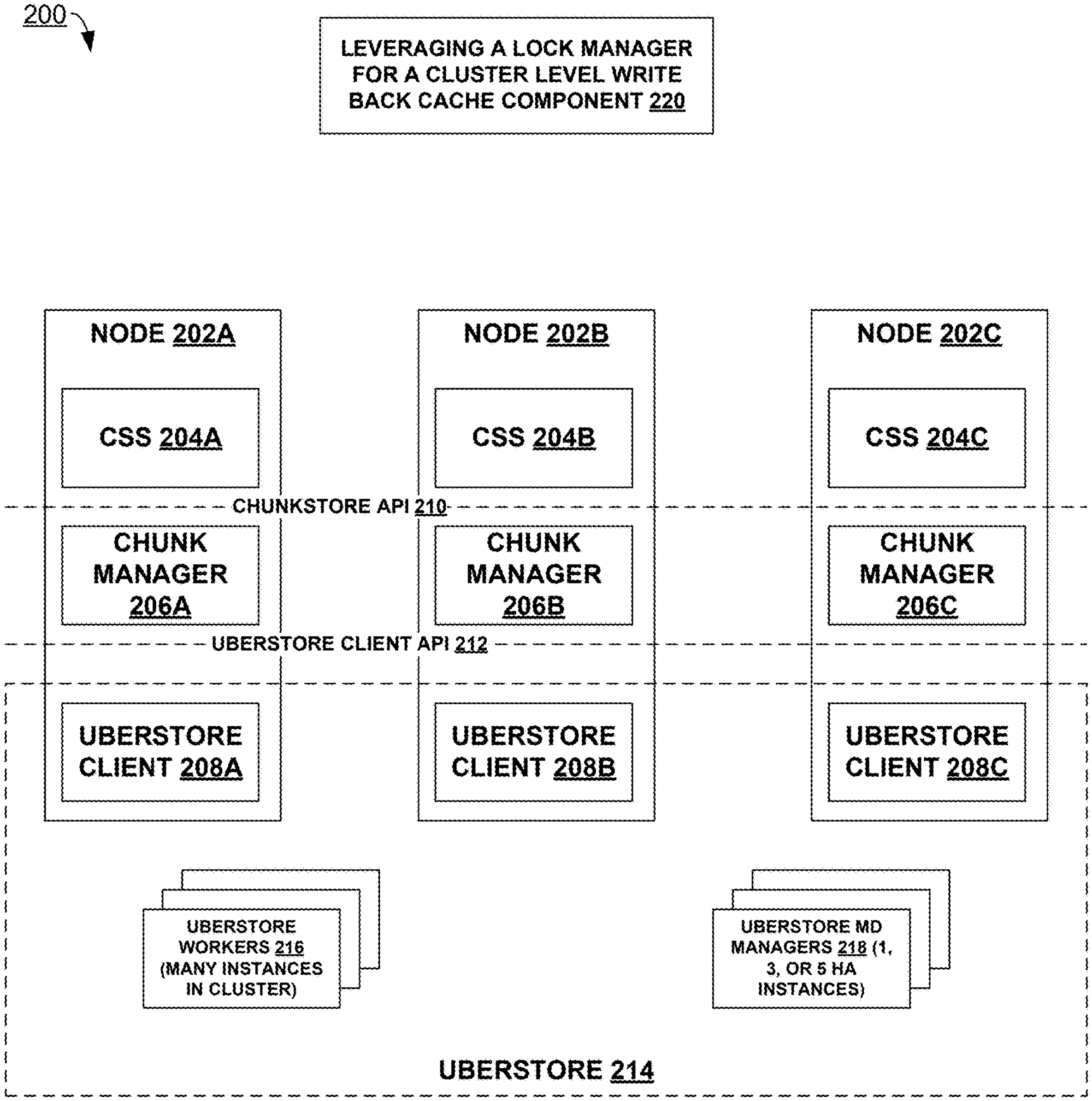
FIG. 2 illustrates another example system architecture of uberstore components in relation to a consumer storage system (CSS) and a chunkmanager, and that can facilitate utilizing a lock manager for a cluster-level write back cache, in accordance with an embodiment of this disclosure.

FIG. 2 illustrates another example system architecture 200 of uberstore components in relation to a consumer storage system (CSS) and a chunkmanager, and that can facilitate utilizing a lock manager for a cluster-level write back cache, in accordance with an embodiment of this disclosure. In some examples, part(s) of system architecture 200 can be used by system architecture 100 of FIG. 1 to facilitate utilizing a lock manager for a cluster-level write back cache.

System architecture 200 comprises node 202A, node 202B, node 202C, CSS 204A, CSS 204B, CSS 204C, ChunkManager 206A, ChunkManager 206B, ChunkManager 206C, Uberstore Client 208A, Uberstore Client 208B, Uberstore Client 208C, ChunkStore API 210, Uberstore Client API 212, Uberstore 214, Uberstore workers 216, Uberstore metadata managers 218 (where filesystem metadata can be used to organize a filesystem, and can be differentiated from user data that a user account wants to store on the filesystem), and utilizing a lock manager for a cluster-level write back cache component 220 (which can be similar to utilizing a lock manager for a cluster-level write back cache component 108 of FIG. 1).

In some examples, CSS 204A, CSS 204B, and CSS 204C can generally implement functionality of data storage architecture component 220 (which is depicted logically here). System architecture 200 can generally comprise three categories of metadata: file system metadata, which is stored in ubers by the CSS and is otherwise similar to file data; chunk manager metadata, which is also stored in ubers and that is otherwise similar to file system metadata; and uberstore metadata, which can be stored in specially identifiable ubers (in some examples, it can be stored elsewhere), and that is used to store and manage the mappings of drive slices to ubers.

An Uberstore generally comprises an underlying distributed redundant array of inexpensive drives (RAID) and input/output (I/O) layer of a Common ChunkStore. The following can be a description of an Uberstore architecture. That is, an Uberstore can generally comprise an evolution of RAID technology that fits under a larger umbrella of RAID techniques, and that is sometimes called distributed RAID or mapped RAID.

As used herein, RAID can indicate that drives are partitioned into slices, and the slices are grouped into ubers, where each uber intersects some but not necessarily all of the drives, and where each drive is fully protected by a combination of some but not all of the ubers in the system. This can be viewed in contrast to an array of drives where each stripe intersects all drives.

A purpose of the Common ChunkStore can be to provide parity, mirror or erasure coded protected storage under a formulation of mapped RAID that controls the grouping of slices into protected sets (ubers). The upper layer storage systems can add most semantic information to the storage, whether it can be files, objects, or block volumes, and their related substructures such as directories and buckets. This upper layer storage system can be referred to as a Consumer Storage System (CSS) 204A, 204B, 204C. The CSS can also perform data reduction, such as deduplication and compression. This can be managed above the Common ChunkStore, and in some examples, the ChunkStore can play a part in data reduction. An objective can be to achieve a major commonality objective in a portion of the storage system data path where there can be overlapping functionality across the platforms by building a high performing, scalable and reliable data reliability platform.

Functionality of the Common ChunkStore can be divided into different modules and layers. The lowest layer can be the Uberstore 214, which comprises four different multi-instance modules, the Uberstore worker, the Uberstore Metadata Manager, and the Uberstore Client (e.g., Uberstore Client 208A) that runs on each node (e.g., node 202A) and links to the ChunkManager (e.g., ChunkManager 206A) and the CSS (e.g., CSS 204A). The Uberstore client also can be linked to a fourth component, the Device Gateway Initiator, which can provide direct I/O access to drives throughout the storage cluster via the network. The Uberstore can be responsible for providing distributed RAID. A purpose of the Uberstore can be to store data and metadata on behalf of the CSS and the ChunkManager, and to protect that data and metadata against loss, corruption, or unavailability by applying an erasure code to it (e.g., parity or mirroring).

An Uberstore 214 can have several responsibilities:

- Allocation of space on drives to form distributed RAID groups, called ubers. Ubers can comprise an allocation of space across multiple drives to provide room for chuklets.
- Adding parity information to data written by the ChunkStore client via the ChunkManager.
- Understanding the state of the drives in the cluster and performing repair actions at the RAID level.
- Data and parity scrubbing as a background operation. It can perform this in conjunction with the ChunkManager, which can hold per chunk metadata used in the scrub.
- Maintaining accurate cached information at the Uberstore clients and Uberstore workers 216 about the layout of ubers on drives, enabling direct read and write I/O from upper layers to the drives.
- Coordinating the ability of ChunkManager clients in the cluster to write ubers at full stripe (data chunk plus parity) granularity.
- Coordinating the garbage collection of ubers to deallocate space back to the drives.
- "Disk Tango" operations, such as moving a drive from one enclosure or node (e.g., node 202A) to another, either singly or in groups, without losing the majority of the data on the drives. An intent with this approach can be to avoid rebuild when replacing the hardware component (shelf or enclosure) that holds some drives.
- Ability to add or remove drives from a drive pool.
- Supporting both discrete node (e.g., node 202A) (drives in the nodes) and disaggregated (drives in separate enclosures on the network) configurations.

There can be boundary conditions based on physical requirements to match the underlying storage devices and media, and logical requirements to match the needs of the consuming system.

The following terms can be used:

- Drive Pool: The storage devices in the cluster can be grouped into one or more drive pools. This can be based on the characteristics of the drives. Drives in a drive pool can have similar internal geometry, performance, special functionality such as flexible data placement, computational capabilities such as self-encryption, and wear budget. Within a drive pool, space allocation can be performed in constant sized units called slices; the size of slices can be set for each drive pool as a whole, and can vary between different drive pools. An Uberstore 214 can support both solid state drives (SSDs) and hard disk drives (HDD); SSDs and HDDs can be in different drive pools.
- Storage Provider Pools: Drive pools can be a special case of storage provider pools. Other storage capacity can be attached to or accessible from a storage cluster, including block storage servers, cloud storage, object storage, or other online media or data storage services. Some of these classes of storage can provide their own physical protection of stored data. The focus of Uberstore 214 can be on managed drive pools where the Uberstore provides the physical protection for the upper layers. Cloud storage, external block storage, and external object storage can be consumed by implementing the same application programming interface (API) as Uberstore. It can be that an Uberstore should be responsive to read requests in a timely way regardless of where the data has been placed in Uberstore-managed storage. The present examples can generally relate to a scenario where the storage provider can be a Drive Pool that can be internal to the cluster.
- Inclusion Group: The drives in a drive pool can be grouped into one or more inclusion groups. The purpose of an inclusion group can be to confine RAID groups (see uber below) to an inclusion group. Inclusion groups can be defined hierarchically, that is, the members of a group can be either drives or inclusion groups (but not both at the same time). This can enable support for two or more tiers of RAID protection. In some examples that do not implement inclusion groups, Drive Pools can be used as the outer boundary for the single layer of RAID supported by the first releases of Uberstore 214.
- Exclusion Group: The drives in a drive pool can be grouped into one or more exclusion groups. The purpose of an exclusion group can be that, within an exclusion group, no more than a specified number of drives can be used within the same RAID group (see uber, below). This can be similar to a fault domain.
- Block: A block can be the smallest unit of read I/O allowed to stored data in Uberstore 214. For Uberstore, a block size of 512 B can be maintained, where this matches a minimum block size exposed by drives. The block can be exposed at the Uberstore interface as a unit of aligned read I/O. Blocks in Uberstore can be individually addressable by their Chunk Domain Block Number. Logically adjacent blocks can have Chunk Domain Block Numbers that differ by one. In some examples, these blocks can be physically adjacent on the storage media. At the upper interface of the ChunkStore, exposed by the ChunkManager (e.g., ChunkManager 206A) to the CSS (e.g., CSS 204A), the CSS can read and write blocks of any size supported by the ChunkManager API. The ChunkManager can repackage those blocks via compression and deduplication, ultimately composing multiple CSS blocks into a chunk to write to the Uberstore write API. This chunk can later be retrieved at 512 B granularity. It can be that there need not be a direct correlation between CSS blocks that are written to ChunkStore, and storage level blocks stored by the Uberstore as addressable parts of chunks.

A scale-out network attached storage (NAS) can use a filesystem block size of 8 kibibytes (KiB). A scale-out NAS can have a minimum read size of 8 KiB for data, and less for metadata and journal I/O. A ChunkManager can translate read requests to scale-out NAS blocks to a read of a number of 512 B Uberstore blocks that collectively contain the targeted data, which can be possibly compressed and/or deduplicated. Uberstore can be unaware of any data reduction that has occurred on data stored in Uberstore, and can be also unaware of filesystem block sizes and alignments; this can be a function provided by ChunkManager which can be aware of the filesystem block size and alignment and also of compression, but can be not aware of upper layer structures such as files.

Indirection Unit: The actual write unit to SSD media can be an Indirection Unit, which can be 4 KiB in some examples, and can be increased to larger powers of two in larger drives (e.g., >16 terabyte (TB) drives). An aspect of Common ChunkStore can be that the minimum write size for RAID protected storage can be a strip, which can be larger than the minimum read size for RAID protected ubers, facilitating using storage devices with large indirection unit (IU) sizes efficiently, where an IU can affect an internal remapping granularity of a storage device. Writing less than an indirection unit of data to an SSD, or at unaligned SSD logical block addresses (LBAs), can result in read-modify-write operations on the drives, which can reduce performance, increase write amplification inside the drive, and increase wear and power consumption.

Sector: The actual read and write unit to HDD media can be a sector, which can be 512 B (or 520 B in some cases). HDDs can continue to support a sector size of 512 B, and can emulate that small sector size by performing read-modify-write operations on larger 4 KiB sectors on disk.

Chunk: The chunk can be the smallest unit of write I/O allowed to store data in the Uberstore. The Chunk size can be fixed within a Chunk Domain, and can vary between different Chunk Domains in the same cluster and drive pool; it can be an outcome of the geometry (aka shape) of the Ubers in the Chunk Domain. Each chunk can be an integer number of 512 B Blocks. The chunk can be a full RAID stripe including either data and parity or mirrored copies of data. It can be that Chunk Domains can only be written in chunks, which are written to a chunk address within the Chunk Domain that can be provided by the ChunkStore. Chunk addresses can be block addresses within the Chunk Domain that align to chunk boundaries. Writing only in full stripes (each stripe can comprise a chunk of data plus additional mirror or parity strips) can simplify the operation of the RAID layer in Common ChunkStore. In-place updates of chunks can be prohibited—that is, it can be that chunks cannot be overwritten until they are first deleted; once they are written they can only be read or deleted. In some examples, a ChunkManager (e.g., ChunkManager 206A) can perform only forward copy—that is, it can completely evacuate ubers rather than overwriting previously written and deleted chunks. It can be that, whether or not ChunkManager recycles individual chunks is not apparent to Uberstore other than it changes uber utilization, which can be maintained by ChunkManager. This can simplify the operation of the Uberstore as it can be that Uberstore does not have to be concerned with locks and races in accessing the stored chunks. Chunk sizes can be variable within the cluster, but fixed within a given Chunk Domain.

Chunk Domain: The Chunk Domain can be a set of blocks, each identified by a Chunk Domain Block Number (CDBM), which can be a relative block address from the beginning of the Chunk Domain [0 . . . N]. Same-size groups of consecutively numbered blocks in the same Chunk Domain partition can be grouped into chunks, and chunks can be identified by their lowest CDBN. A cluster can have many Chunk Domains. Chunk Domains can each uniquely serve some function for the CSS (e.g., CSS 204A) or for ChunkManager, for example, data ingest, long-term data storage, CSS metadata storage, etc. Some Chunk Domains can serve internal purposes, such as metadata storage for the ChunkManager. The Uberstore 214 can also store its own metadata in its own managed drive areas; it can be that this data can be never consumed or seen directly by any upper layers. These drive regions can be on local devices and can be partitions of drives that otherwise store ChunkStore data, or on entirely separate drives. Data and metadata that the Uberstore stores on behalf of upper layers can be stored in ubers that are components of a Chunk Domain. Uberstore metadata can be stored in back end volumes (BEVs), without the additional abstraction of Chunk Domains. The Chunk Domain can comprise an integer number of chunks. Each Chunk Domain can be accessible cluster wide. Each Chunk Domain can be confined to a single drive pool. The drive pool can be utilized to construct multiple Chunk Domains with different characteristics, including different RAID shapes. A constant for a drive pool can be that slice size can be constant within the drive pool. The Chunk Domain can be analogous to a block volume, with the following differences:

- It can be only writable in chunks, at chunk aligned boundaries, not arbitrary blocks, at the Uberstore Client API 212. It can be readable as 512 B aligned and sized blocks.
- It cannot be accessed via block protocols. It can be accessed via the Uberstore Client API.

| Subsystem Layer | Object Mapping Between Layers | | | | | | |
|---|---|---|---|---|---|---|---|
| CSS (Client Storage System) | Chunk Domain | N/A | N/A | N/A | Block | | |
| ChunkManager | Chunk Domain | N/A | Group of chunks (data | N/A | Chunk (data portion | N/A (or Chunklet) | Block (Data only) |

-continued

| Subsystem Layer | Object Mapping Between Layers | | | | | | | |
|---|---|---|---|---|---|---|---|---|
| | | | portion only) | | | of a stripe) | | |
| Uberstore | Backend Volume Group | Back-end Volume (Data and parity or mirrors) | Uber Group | Uber | Slice | Stripe (includees data and parity or mirrors) | Strip (parity and/or data) | Block |

Clients in the Client Storage System can be aware of Chunk Domains, which they write data to and read data from, and blocks, which can be the granularity of read and write I/O to the ChunkStore.

The ChunkManager (e.g., ChunkManager 206A) can be an intermediary between the CSS (e.g., CSS 204A) and the Uberstore 214. It can perform data manipulations such as deduplication and compression, which can transform the presented blocks on the way to and from the underlying storage in Uberstore. For example, it can perform deep data reduction operations such as larger compression granularity, and deeper deduplication. This can be done in conjunction with data tiering operations, which can also be performed by ChunkManager. For scale-out RAID, it can be that the CSS can handle ingest of data and perform block granular compression. The ChunkManager can later recompress the data blocks in larger groups, for example during forward (garbage) collection to reclaim more space. This can be all above the Uberstore, which can play no role in compression or deduplication of data.

Therefore, the ChunkManager interface can take data to write as blocks or lists of blocks. It can then pack and prepare the data into chunks. Chunks can be fixed sized aggregations of data, CSS metadata, CSS journal, or ChunkManager metadata. It can be common to separate chunks into different categories depending on use case, reliability and performance requirements. Packing and preparing can include deduplication and compression of the data. This can be all ChunkManager functionality. Uberstore can encrypt data for storage at the granularity of entire chunks (see below). The chunks can be written in their entirety to a Chunk Domain target by the ChunkManager, to a specified Chunk address in the Chunk Domain.

It can be that CSS blocks are not necessarily preserved as Uberstore blocks, or even aligned to the same boundaries. Generally, the ChunkManager can keep CSS blocks intact when packing them into chunks, but CSS blocks can straddle Uberstore block boundaries.

The Uberstore write API can accept a Chunk of data (which can be, e.g., user data, CSS metadata, or ChunkManager metadata) with a specified chunk address. If the chunk address can be valid, that is, if the chunk can be available for that ChunkManager to write and the chunk has not been previously written (it can be that only the one ChunkManager client has write privilege for a chunk; write privilege can be by definition write-once), then the Uberstore Client (e.g., Uberstore Client 208A) can divide the chunk into strips, compute and insert parity strips as needed, and write out the chunk plus parity as a Full Stripe Write to the targeted storage devices. The full stripe can be a collection of data and parity blocks which can be written to different drive slices in the cluster. Or it can be multiple mirrored copies of the data.

Generally, Uberstore can support full chunk writes at large granularity chunk size (e.g., 2 MiB) with inserted parity or erasure coding information added. Parity can be XOR (e.g., RAID5, EvenOdd, or row-diagonal parity (RDP) RAID6), Reed Solomon (RAID6), or others. This can provide a data write mechanism that can be suitable for log-style writers common across most modern storage systems. Systematic codes can be preferred as maximum distance separable (MDS) codes. Reed Solomon can be an erasure code used for log data. For write-in-place data, as well as for low-latency logs such as journals, 3× mirroring can be used. Here the chunk size can be one CSS block, which can be 8 KiB for data, and as small as 512 B for journals and metadata. Similarly, the ChunkManager itself can use its own internal Chunk Domains for its own metadata and these can likely also be mirrored with a small chunk size to support write-in-place as well as journaled I/O styles.

The write I/O interface provided by Uberstore 214 can accept Chunk-sized writes as appropriate for the Chunk Domain being written. It can reject writes that are the wrong size for the Chunk Domain being written (and for its underlying ubers). Chunk Domains can co-exist in the same drive pool and use the same slice size for drive space allocation as other Chunk Domains in the same drive pool, while they can have different uber sizes and different RAID formulations. This can be referred to as an uber's "shape."

The Uberstore can provide a granular interface for reading data. It can return data from chunks at block granularity. Block size for Uberstore can be universally set to 512 B, regardless of the block size(s) used by the CSS (e.g., CSS 204A) above or the drives below. It can be that, for the vast majority of writes, the write size (equal to the strip size) can be greater than or equal to the IU size of the drive, eliminating the increase in write amplification that results from read-modify-write in large IUs.

On read, Uberstore generally can retrieve only the data strips (or portions of data strips) being read from the drive slices that compose the uber. Then it can return the requested blocks to the ChunkManager. This can be a contiguous string of consecutive blocks, or a scatter-gather list of blocks to be loaded into addresses provided by the ChunkManager via the Uberstore Read API. Data read from Uberstore can be likely to have been compressed by the CSS or ChunkManager; it can be that it is not the Uberstore's responsibility to decompress the data. As a result, it can be that block alignment between CSS blocks and Uberstore blocks on drives can be not assured, or even not likely. Uberstore can also perform a verify read operation, which can force reconstruction of the specified block(s) from stripe parity.

Generally multiple such reconstructions can be possible for a stripe, for example from both P and Q parity for a single block reconstruction. This can be used by the ChunkManager to force reconstruction of blocks when their content does not match expected values.

Similarly, the ChunkManager can have encrypted data. Uberstore can be unaware of any encryption and does not manage keys. ChunkManager can also directly consume its own metadata from its own Chunk Domains.

Uberstore can be built using a distributed RAID layer. Uberstore can support direct I/O from CSS client nodes to local or network attached devices for both the read and write path. To make this possible, each node (e.g., node 202A) can have an Uberstore client library that performs the chunk and block granular I/Os, along with parity construction, degraded read reconstruction and any other RAID operations. Each node's Uberstore client stack can link, or can send messages, to a Device Gateway Initiator, which can access a Non-Volatile Memory Express (NVME) reachable drive in the cluster.

Each node (e.g., node 202A) can maintain a local cache of uber layouts for recent and current ubers. For writable ubers, this can contain additional information, such as Reclaim Unit Handles for the slices of the open (for writing) ubers. Since flexible data placement (FDP) drives can have a limited supply of reclaim unit handles (RUHs) (e.g., 8, or at most 16, in some FDP enabled drives), it can be a requirement on Uberstore to manage the limited supply of handles Terminology Mapping

| Common ChunkStore | Containing Object | NAS Storage | Software Defined Infrastructure | Function |
|---|---|---|---|---|
| Uberstore worker | 1 per node | none | PDS (portion of function) | The Uberstore worker can be the context for execution of one or more uber/uberlet DBs |
| Uberstore client | 1 per node | Some similarity to a block allocation manager (BAM) and a remote block manager (RBM). | Uber/uberlet DB (shift of I/O function to client node) | The Uberstore client performs direct I/O to drives on behalf of ChunkStore client storage systems. It maintains a cache of uber layouts. It also can be responsible for adding parity or mirroring to written chunks to form full stripes. It also reconstructs missing blocks on the fly during degraded reads (although it can be that it is not expected to repair those blocks) |
| Uber | Uber Group | none | Uber | Mapped RAID group. Each uber contains a set of sequentially numbered, logically contiguous chunks in the same Chunk Domain, plus their parity or mirrored blocks. |
| Slice (or uberlet) | Uber | none | slice | Single drive contribution to an uber. |
| Chunk (could be the data-containing portion of a stripe in an Uber) | Chunk Domain | none | Log (in Logical Layer) | Individually writable collection of logically-contiguous blocks of fixed size to a Chunk Domain (they may or may not be physically contiguous depending on where the logical numbering crosses slice boundaries). |
| Stripe | Uber | none | Stripe (in Physical Layer) | A complete RAID stripe of strips that holds exactly one chunk of data. |
| Strip | Stripe | — | Strip | Portion of a stripe that resides in one slice. It can contain data and/or parity/mirror blocks, depending on the RAID encoding. |
| Chunk Domain | Drive Pool | none | None. Scoped and virtualized like a Storage Pool, but physically addressable. | Block addressable collection of chunks. Distributed management across multiple uber/uberlet DBs, which are distributed across the Uberstore workers. |
| Exclusion Group | Drive Pool | Fault domain | Fault Set | Collection of storage devices (e.g. drives) that are limited with respect to their membership in individual ubers. For an exclusion group, no more than n slices can come from the same exclusion group in any uber. |

-continued

| Terminology Mapping | | | | |
|---|---|---|---|---|
| Common ChunkStore | Containing Object | NAS Storage | Software Defined Infrastructure | Function |
| Inclusion Group | Drive Pool | Drive Pool | Device Group | Collection of storage devices or other inclusion groups which ubers are limited to. For any uber, it can be that all its slices must come from one inclusion group. |
| Drive Pool | Cluster | Drive Pool (no hierarchy) | Device Group | Collection of similar drives. |
| none | none | none | Storage Pool | Pool of reserved space in a device group that has a defined RAID level. Some similarity to Chunk Domain, but not internally addressable. |
| Uber Group | none | none | none | In some examples, an Uber Group can be made of collection of contiguous Chunks. In other examples, an Uber Group can be made of discontinuous UBERs (up to UberStore), where the same Reclaim Unit Handle for a storage drive is used to write to those Ubers. A Reclaim Unit Handle can generally comprise a handle to a storage device that facilitates orderly future garbage collection on the device. |

Since Chunk Domains can be cluster-scoped entities, there can be a small number of Chunk Domains, relatively independent of the size of the cluster. Different Chunk Domains can be required to separate data by protection level (e.g., 8+2 RAID vs 16+3 RAID), by media type (e.g., triple-level cell (TLC) vs. quad-level cell (QLC)), and/or by type of data (hot vs. cold, metadata vs. user data).

The chunks can be small enough that buffering enough data to put in a chunk can be done without frequently forcing the CSS (e.g., CSS 204A) to persist the data separately. The chunks can be large enough that a reasonably wide full stripe whose strips are at least one drive IU in size can be formed for efficient writing. For scale-out RAID, this amount of data can be about 2 mebibytes (MiB). The chunk can be striped across many drives (e.g., 8 or 16, and other values can be supported). This can lead to a strip size of 256kiB or 128kiB (for 8- and 16-way striping respectively at a 2 MiB chunk size). This can facilitate writing at least one drive level IU—SSDs can manage the alignment to avoid fragmenting writes. For wider chunks (e.g., 64±4), the chunk data size can be made a multiple of the maximum IU size in the drive pool, e.g., 64×256kiB=16 MiB. It can be that larger chunks involve writing more data in a single operation. This can be useful when staging the data into a high-performance tier, then later destaging it to a colder tier for longer term storage, where optimization for RAID capacity efficiency can be performed.

Uber: Consecutive chunks in a Chunk Domain can be grouped into ubers. Ubers can be fixed size within a Chunk Domain, and can be of different sizes between Chunk Domains. Therefore, within a Chunk Domain, the ubers can have the same number of chunks and the same number of blocks. Ubers can be constructed from a collection of slices, each of which can contain either data or parity (or some encoding of both), and each of which can contain one independent portion of the uber that can be stored on one drive. It can be that each slice must be on a different drive from the same drive pool; other restrictions on slice placement can also be enforced by the Uberstore to ensure proper isolation of different failures. Within a drive pool, all slices can be of the same size. This can facilitate allocation of slices to different Chunk Domains with different RAID parameters from the same drive pool. The slice can be the amount of consecutively numbered drive space allocated to the uber on each drive. In an example, with strips of 256 KiB and 4k chunks per uber, the slice size can be 1 GiB.

It can be that ubers can contain many fewer slices than there are drives in the pool. The "width" of the uber (the number of slices in it) can be defined by the Chunk Domain that the uber is assigned to. A Chunk Domain can be similar to a block volume in this respect; it can be a linearly addressed range of blocks, where consecutively numbered groups of data blocks with added parity are called chunks, and consecutively numbered groups of chunks form ubers. Each uber can be composed of n data and m parity or mirroring slices. Each uber can be striped into chunks, where each chunk can be composed of strips, and each strip can be the portion of a stripe that resides on one slice. The strip can be sized to match the largest IU size that is expected to be encountered for the next several drive generations (it can be made bigger at that time). This can be 128 kB or 256 kB, in some examples. The chunk size can vary depending on the width of the uber. So, for a given drive pool, slice size and strip size can be fixed, and for a given Chunk Domain, uber size and chunk size can be fixed. Different Chunk Domains can be allocated from the same drive pool, and these can have different RAID structure, therefore different uber and chunk sizes, but can have the same slice sizes as each other.

An uber can be sized to be several GiB of readable data, plus additional space for parity or mirrored blocks. For example, with 2 MiB chunks, 4,000 consecutive chunks can be grouped into an uber, giving an uber size of 8 GiB. Uber sizes, like chunk sizes, can vary between Chunk Domains.

The purpose of the uber can be two-fold:

The uber grouping of chunks can be used to reduce the metadata footprint of the Common ChunkStore to track the layout of RAID groups mapped to drives. It can also reduce the workload involved to allocate drives into chunks, by a factor of 4k times in the example above.

An uber can be used as a unit of write space allocation to individual nodes in the cluster. That is, in a scaleout storage system, each node (e.g., node 202A) can get exclusive write access to an uber from each Chunk Domain it wishes to write to. Using ubers for this can simplify both the allocation of this space to writers and the management of the space in the common ChunkStore.

Ubers can comprise relatively large amounts of data space; typical Uber size can be on the order of 8 GiB. In a large cluster, with each node (e.g., node 202A) writing, this can result in a total pre-commitment of writable space to nodes on the order of small TBs. In an example with an average of pre-committed but unused space per node of 0.5 uber, this can comprise pre-committing on average several GB per node. This can be a small fraction of the total usable space in the cluster, as total storage capacity can be many TBs per node.

Each chunk can be striped across an entire uber and can be divided into strips where a strip can be the portion of a chunk (data or parity) that resides in one of the slices. Chunks can be uniformly striped across the slices, as if the slices were each a tiny disk drive. If there are n chunks in an uber, then there can be n strips in each slice in the uber, and they can all be in the same order in each slice. The location of the parity strips in each chunk relative to the data strips can vary to allow rotated parity, which can give a balance of read I/O across the drives.

In some examples, CSS (e.g., CSS 204A) can read any block stored in any Chunk Domain in ChunkStore at the scope of the cluster. Access of some CSS entities can be restricted to some Chunk Domains in the future to support multiple CSSs sharing the same Uberstore infrastructure. It can be that no restrictions can be imposed unless system-level multi-tenancy is implemented. The CSS can write chunks to any Chunk Domain in the ChunkStore at the scope of the cluster, but with restrictions. In some examples, the CSS must negotiate with the Uberstore via the ChunkStore API 210 to get a set of writable chunks, which it can have exclusive permission to write. The granularity of this allocation can generally be in entire ubers. The CSS can be unaware of ubers, and only deals with chunks for writing and blocks for reading ChunkStore Physical Block Addresses. The term Physical Block Address can be used for the block addresses within a Chunk Domain. There can be another layer of mapping in Uberstore to resolve a Chunk Domain Physical Block Address (which can be referred to as a CDBN) to a drive Logical Block Address (LBA), which in turn can be mapped internally to the drive by a Flash Translation Layer (FTL) to an actual position in media.

The interface between the CSS and the Uberstore 214 can be via the ChunkManager (e.g., ChunkManager 206A). The ChunkManager can perform a mapping from virtual block numbers, which can be stored in CSS data structures such as filesystem inode mapping trees (which can be inode format manager (IFM) trees; an inode can comprise a data structure that describes a file or a directory in a filesystem. Each inode can store attributes and disk block locations of the object's data), to Chunk Domain Block Numbers (CDBNs) via a virtual to physical block number map. The ChunkManager or CSS can perform data reduction including deduplication and compression. It can be that the Uberstore is not involved in data reduction. On write, ChunkManager can be supplied with full chunks that can be ready to be RAID protected and turned into full stripes by Uberstore. The mapping of logical block numbers within the CSS to virtual block numbers can be entirely managed by the CSS and can be outside the scope or awareness of the Uberstore. In some examples, each virtual block number can usually reference one 8 KiB data or metadata block; it can also reference a 512 B software journal block. The assigned virtual block numbers can be sparse or dense in virtual block number space—virtual block numbers can be similar to keys that return a value (a logical Chunk Domain Block Number). The virtual address map can be a ChunkManager structure; the Uberstore can be unaware of virtual block numbers. The Chunk Domain Block Number (CDBN) can be the block numbering within a single Chunk Domain; it can be zero-based. Chunk Domains can be cluster-scoped and have distributed management across many uber/uberlet DBs. A ChunkManager can be unaware of ubers, uber groups, and uber/uberlet DBs, although its interactions with Uberstore can be optimized with hints that relate to the underlying construction of the Chunk Domains.

There can be one more mapping to translate the CDBN into a Storage Block Address (SBA). The storage block address can be a direct reference to a single drive block within a single drive namespace. While a common ChunkStore can be further layered on some other external block storage provider that might provide protection, it can be that a common case is that the SBA resolves to a block in a physical media device, such as an NVMe SSD or HDD. In SSDs, the drive LBA can undergo an additional mapping within the drive Flash Translation Layer (FTL) before finally resolving to a physical location on the media. A Chunk Domain Block Number can be the combination of:

A Chunk Domain identifier; and

A block address (block size can be a multiple of 512 B, to match minimum device level block sizes) in the Chunk Domain.

| Virtual Block Number | Virtual to Chunk Domain Mapper | Chunk Domain Block Number | Storage Block Address |
|---|---|---|---|
| Stored in CSS data structures<br>References a unique block in the ChunkStore<br>There can be multiple references to the same virtual block from different metadata structures (e.g. inodes, | Maps each unique virtual block number to a single block address in a Chunk Domain. Chunk Domain Block Numbers are unique cluster-wide. | Chunk Domain Block Numbers identify a Chunk Domain, and a block position within the Chunk Domain.<br>The block position can be directly convertible into uber number, chunk index within uber, strip number within chunk and block number within a strip.<br>This can be translated with a | A storage block can be identified by a Drive ID in a cluster, and a Logical Block Address on that drive. |

-continued

| Virtual Block Number | Virtual to Chunk Domain Mapper | Chunk Domain Block Number | Storage Block Address |
|---|---|---|---|
| logical unit number (LUN) block lists) in the CSS | Virtual block number (VBN) to CDBN maps are distributed across the cluster; the VBN key can determine which map shard to use for lookup. | minimum of computation and metadata lookup into a Storage Block Address. | |
| CSS_Data_Structure. VirtualBlockNumber_x → (map in CSS) This mapping can be done outside the Uberstore. The interface to the Uberstore takes a Chunk Domain Logical Block Address as an argument. | Chunk_Domain_Block_Address → (translate) | Chunk_Domain, Uber, Chunk, Block → (lookup Uber Layout) Chunk_Domain = Extract_Chunk_Domain (Chunk_Domain_Block_Address) Chunk_Domain_info = Lookup_Chunk_Domain (Chunk_Domain ) UberNum, Block_in_uber = Calculate_Uber_Number (Chunk_Domain_info, Chunk_Domain_Block_Address) Uber_Layout = Uber_Lookup(UberNum) DriveID, Drive_LBA = Calculate_Block_Position (Uber_Layout, Block_in_uber) | Drive, Drive_LBA |

Figure 3:
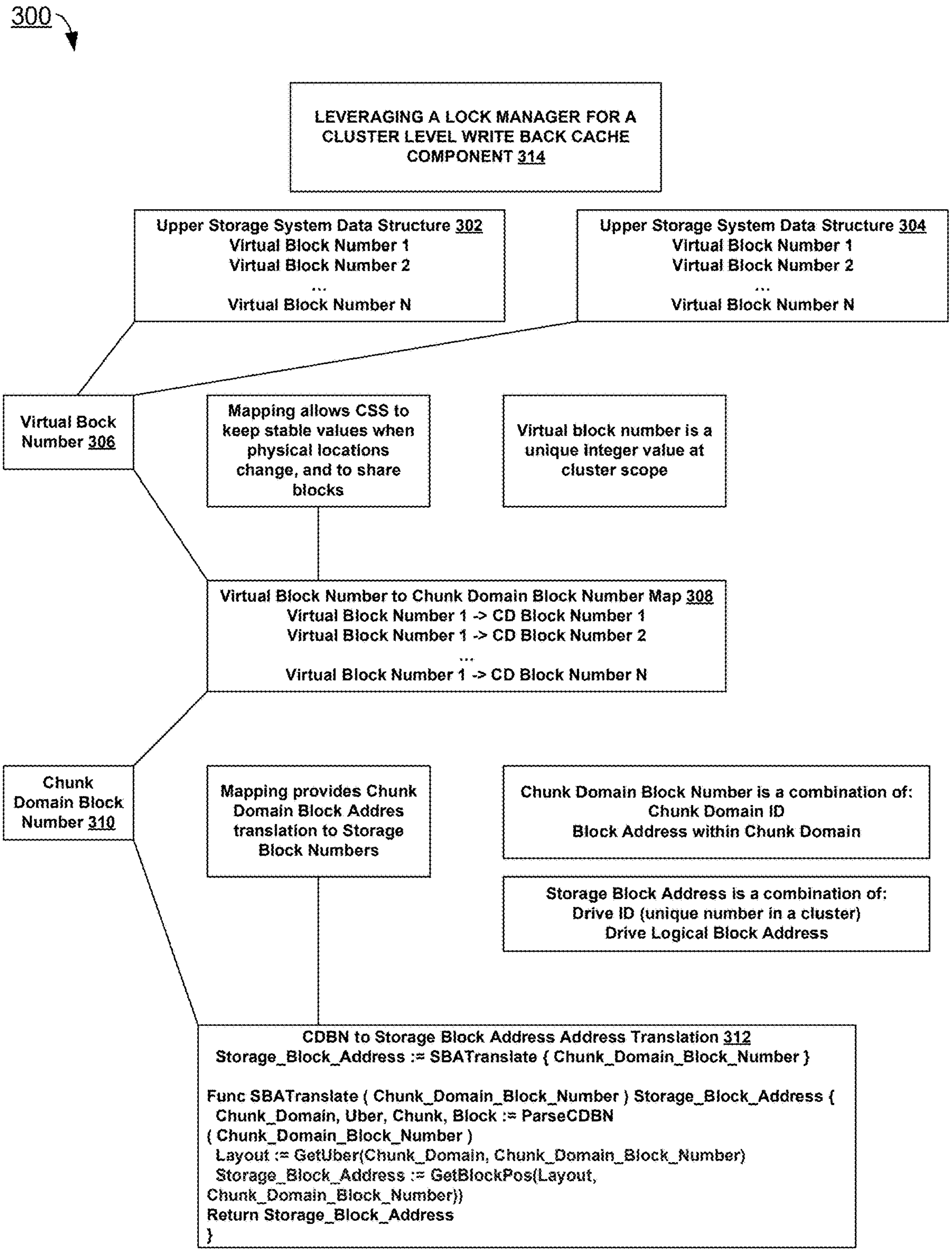
FIG. 3 illustrates another example system architecture of address translation between layers of a storage system, and that can facilitate utilizing a lock manager for a cluster-level write back cache, in accordance with an embodiment of this disclosure.

FIG. 3 illustrates another example system architecture 300 of address translation between layers of a storage system, and that can facilitate utilizing a lock manager for a cluster-level write back cache, in accordance with an embodiment of this disclosure. In some examples, part(s) of system architecture 300 can be used by system architecture 100 of FIG. 1 to facilitate utilizing a lock manager for a cluster-level write back cache.

System architecture 300 comprises upper storage system data structure 302, upper storage system data structure 304, virtual block number 306, virtual block number to chunk domain block number map 308, chunk domain block number 310, CDBN to storage block address address translation 312, and utilizing a lock manager for a cluster-level write back cache component 314 (which can be similar to utilizing a lock manager for a cluster-level write back cache component 108 of FIG. 1).

Each Chunk Domain can have a defined chunk size, strip size, uber size and RAID layout. Strip size can be limited by RAID layout and by the characteristics of the drives in the drive pool. Slice size can be fixed in the drive pool to simplify raw storage space allocation. The Chunk Domain can be limited to a drive pool. The Chunk Domain Block Number 310 can specify the Chunk Domain as a 12 b field.

Chunks can consume more raw storage space than their data size due to the inclusion of parity or mirroring blocks in the chunk along with the data. Within a Chunk Domain, there can be a common uber format, including a common RAID layout. An example Uber layout can be RAID-6 8+2 rotating parity layout containing 8 data strips and 2 parity strips per chunk—this can be referred to as an 8+2 layout. Different Chunk Domains can have different chunk sizes, and different uber layouts (it can be that, within a drive pool, all slices must be the same size for uniform and simple allocation of drive LBA space). Chunk Domain numbering can be arbitrary up to the limits of the field containing the Chunk Domain ID; it can be that Chunk Domains must be uniquely numbered in the cluster but are not required to be sequentially allocated. The Chunk Domain id can be a fixed field found at the start of a Chunk Domain Block Number. It can be that there are a relatively small number of Chunk Domains in a cluster, so Chunk Domain ID can be a small number, e.g., 12 bits, which can be packed as the high order bits field in a Chunk Domain Block Number.

If an uber/uberlet DB fails, a backup uber/uberlet DB can be designated by Uberstore to handle the operations. The uber/uberlet DB can be an active element in the failure-free data path. In Uberstore, since direct I/O can be enabled by Uberstore clients, it can be the Mus are not in the data path for normal case I/Os (read or write) and are responsible primarily for managing caches of Uber layouts at the Uberstore clients. In this case, the uber/uberlet DB can act as a layout caching intermediary between the Uberstore client and the MDM. This extra complexity can be intended to reduce the load on the MDM for routine uber layout lookups for read operations. A simpler alternative architecture and implementation can be to have each Uberstore client talk directly with the MDM to get uber layouts. This can be a simpler approach, and can reduce the role of the uber/uberlet DB to execution of Uber level operations such as repair and rebalancing at the instruction of the MDM. It can be that the uber/uberlet DB on its own cannot perform forward collection (space reclaim, that is, garbage collection, restriping, tiering or rekeying). Therefore, the uber/uberlet DB can perform direct drive I/O. The MDM can be the manager of all repair operations, while the uber/uberlet DBs perform the repairs. For any individual drive failure, this allows for mesh rebuild, with different uber/uberlet DBs on different nodes performing repairs at uber granularity. The uber/uberlet DB can be a context (such as including a thread) in an Uber Worker.

The following is an example breakdown of a 64 b Chunk Domain Block Number.

| Bits | Value | Quantities |
|---|---|---|
| 63-60 | Reserved | 4 reserved bits |
| 59-52 | Chunk Domain ID | Up to 256 Chunk Domains per cluster |
| 51-48 | Reserved | 4 reserved bits |
| 47-40 | Chunk Domain Segment ID | Up to 256 segments per Chunk Domain |
| 39-0 | Block Number in Segment | 4Ti of 512B blocks = 2PiB per segment addressable space |

8 bits are dedicated for Chunk Domain ID, leaving some reserved bits for future expansion of those fields, introduction of other fields or expansion of the Block Number field. This can limit the number of uber/uberlet DBs that can be assigned to a Chunk Domain to 256. The total number of uber/uberlet DBs in the cluster can be larger; this can be a parameter determined by the Uberstore implementation and deployment.

The CSS can store virtual block numbers (e.g., virtual block number 306) in its data structures that reference stored data or metadata. CSS virtual block addressing can be done via a globally unique virtual block number (VBN), which can be a large globally unique key. There can be different approaches to assigning the virtual keys. In some examples, virtual keys are uniquely assigned serial numbers scoped by uber/uberlet DB. In some examples, the virtual block number can be actually a block address within a special Metadata Chunk Domain that contains only virtual to physical mapping structures. In some examples, there can be one Virtual Block Pointer Chunk Domain per cluster. The metadata block structure of the virtual Chunk Domain can fit into one 512 B block and can generally contain many virtual block pointers (up to 32, in some examples). This can give a total addressability of 256 tebibytes (Ti) of virtual structures, referencing between 1 and 32 CSS blocks each. If, for example, CSS blocks are 8 kB, this can give a maximum capacity of greater than 73 exabytes (EB) of protected capacity usable by the CSS and for chunkmanager metadata. The virtual block pointers can survive restriping and tiering operations. Therefore, it can be that they are not divided into different Chunk Domains. This design can be similar to some examples that allocate virtual block numbers sequentially within the scope of each uber/uberlet DB. These virtual block numbers can be the keys used to lookup Chunk Domain Block Numbers. This lookup can take place in a VBN to CDBN map, which can be managed by the ChunkManager above the Uberstore API.

To translate to a physical address, a translation function can convert a relative offset to an uber that maps to that relative address. From there, the translation function can compute an offset in the uber to get the address on the drive.

This translation function can be:

Layout:=GetUber(Chunk_Domain, Chunk_Domain_Block_Number)

Storage_Block_Address:=GetBlockPos(Layout, Chunk_Domain_Block_Number))

Figure 4:
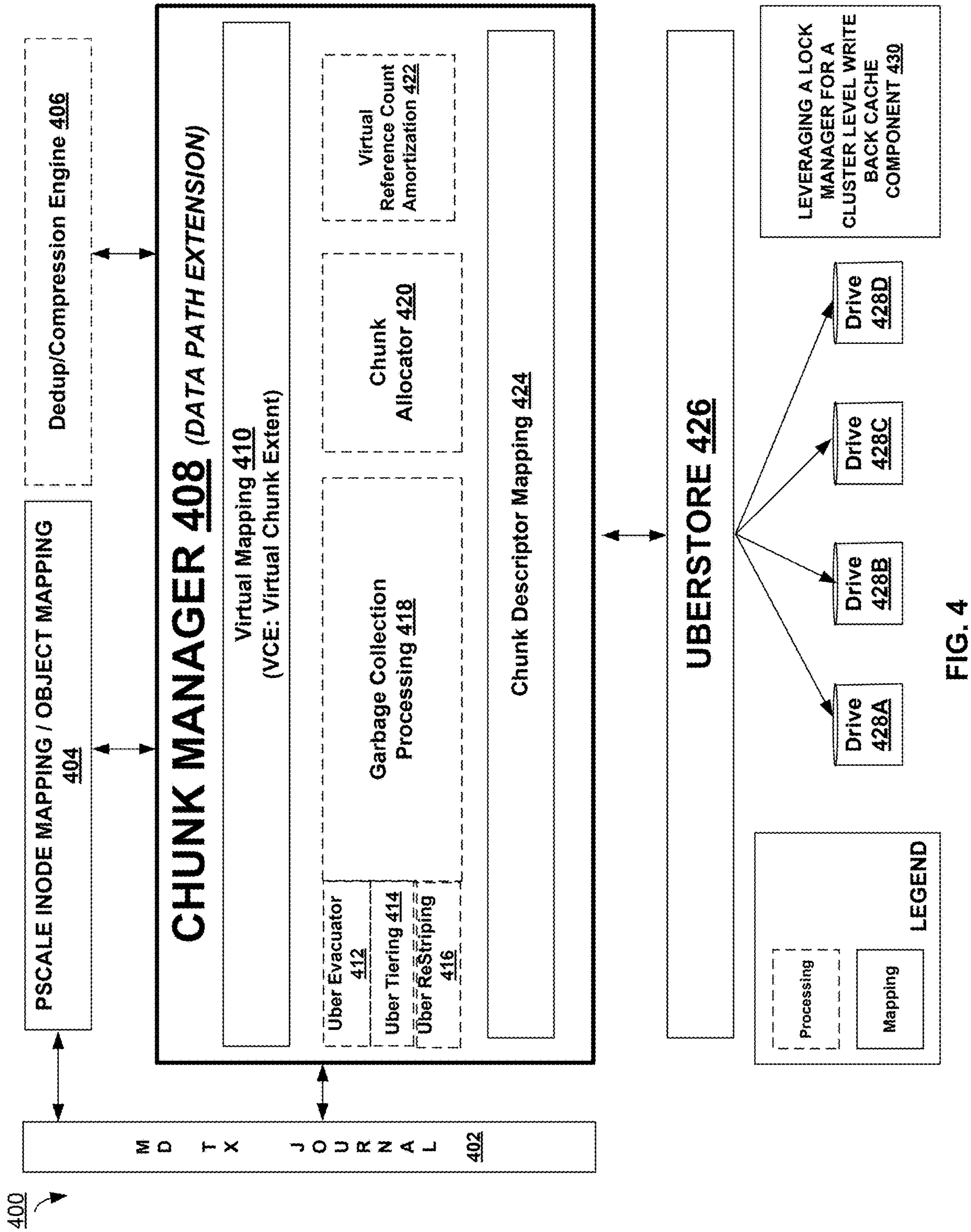
FIG. 4 illustrates another example system architecture of a chunkmanager in relation to other storage system components, and that can facilitate utilizing a lock manager for a cluster-level write back cache, in accordance with an embodiment of this disclosure.

FIG. 4 illustrates another example system architecture 400 of a chunkmanager in relation to other storage system components, and that can facilitate utilizing a lock manager for a cluster-level write back cache, in accordance with an embodiment of this disclosure. In some examples, part(s) of system architecture 400 can be used by system architecture 100 of FIG. 1 to facilitate utilizing a lock manager for a cluster-level write back cache.

System architecture 400 illustrates an arrangement of a ChunkManager between a scale-out NAS and an UberStore. The ChunkManager can manage chunks (stripes), and can comprise mapping structures and processing.

System architecture 400 comprises MD transaction (Tx) journal 402 (a journal that stores updates to metadata in a transactional manner such that updates that modify multiple disjunct pieces of metadata can be executed in an atomic fashion (that is, either all updates happen, or no updates happen)), scale-out NAS inode mapping/object mapping 404, dedup/compression engine 406, chunkmanager 408, virtual mapping 410, uber evacuator 412, uber tiering 414, uber restriping 416, garbage collection processing 418, chunk allocator 420, virtual reference count amortization 422, chunk descriptor mapping 424, uberstore 426, drive 428A, drive 428B, drive 428C, drive 428D, and utilizing a lock manager for a cluster-level write back cache component 430 (which can be similar to utilizing a lock manager for a cluster-level write back cache component 108 of FIG. 1).

Figure 5:
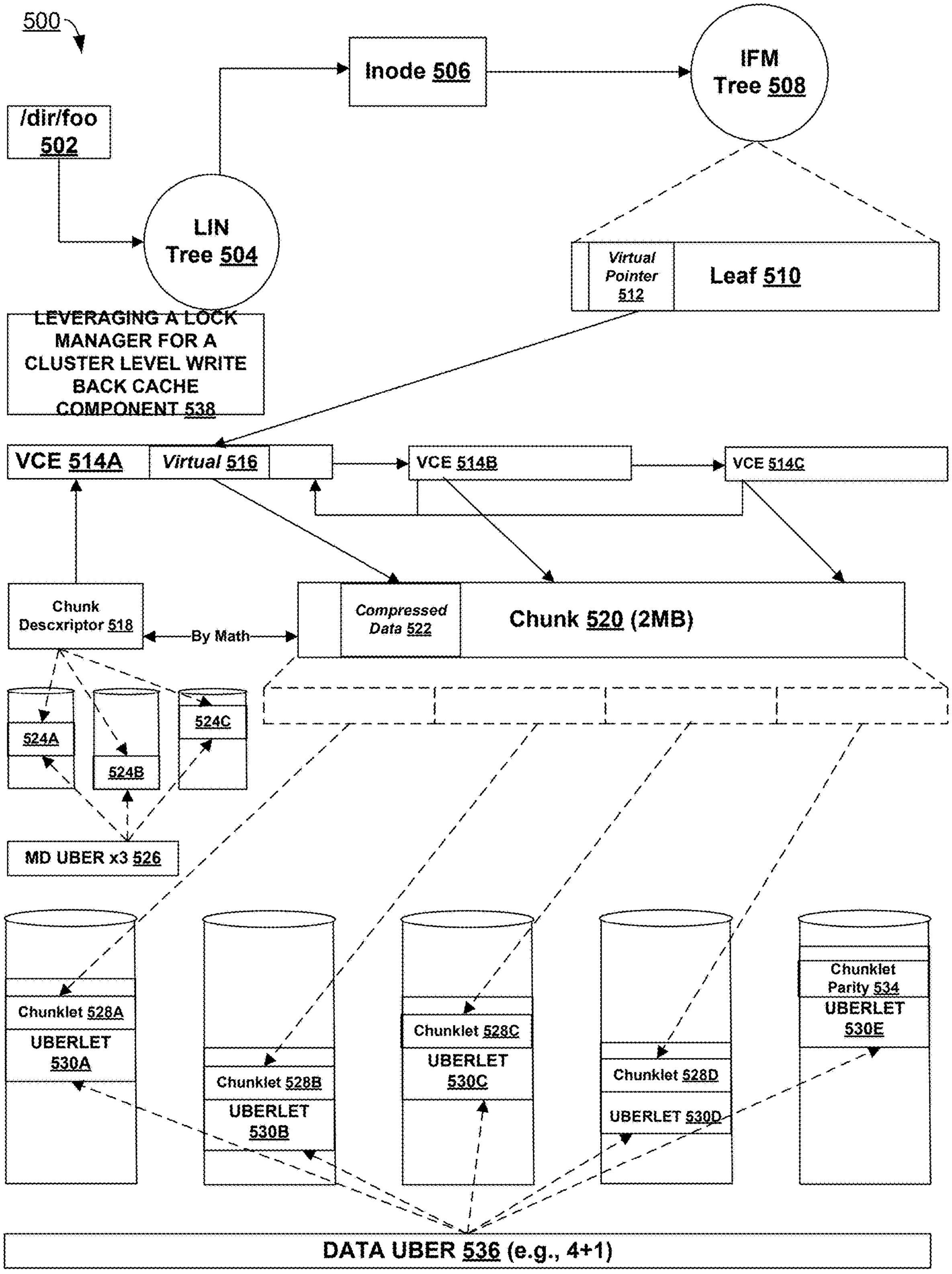
FIG. 5 illustrates another example system architecture of inode mapping in a chunkstore, and that can facilitate utilizing a lock manager for a cluster-level write back cache, in accordance with an embodiment of this disclosure.

FIG. 5 illustrates another example system architecture 500 of inode mapping in a chunkstore, and that can facilitate utilizing a lock manager for a cluster-level write back cache, in accordance with an embodiment of this disclosure. In some examples, part(s) of system architecture 500 can be used by system architecture 100 of FIG. 1 to facilitate utilizing a lock manager for a cluster-level write back cache.

System architecture 500 illustrates an overview of mapping structures.

System architecture 500 comprises filesystem path 502, logical inode (LIN) tree 504, inode 506, IFM tree 508, leaf 510, virtual pointer 512, virtual chunk extent (VCE) 514A, VCE 514B, VCE 514C, virtual 516, chunk descriptor 518, chunk 520, compressed data 522, uberlet 524A, uberlet 524B, uberlet 524C, metadata uber x3 526, chunklet 528A (one piece of data on one device, where a chunk is stored across multiple devices, and can include parity information on other devices), chunklet 528B, chunklet 528C, chunklet 528D, uberlet 530A, uberlet 530B, uberlet 530C, uberlet 530D, uberlet 530E, chunklet parity 532, data uber 534, and utilizing a lock manager for a cluster-level write back cache component 536 (which can be similar to utilizing a lock manager for a cluster-level write back cache component 108 of FIG. 1).

Virtual pointer 512 can generally comprise a pointer to a virtual (e.g., virtual 516) per 8 KB data block. Virtual pointer 512 can comprise a VCE address, and an offset of the virtual in the VCE. In some examples, a VCE can comprise 32 virtuals. Virtual 516 can comprise an offset in a chunk, a length of the data (compressed of the 8 KB), and flags or information about the block.

A virtual chunk extent (VCE, e.g., VCE 514A) comprises a virtualization layer between inode mapping and the physical layer (Chunks, e.g., chunk 520), enabling features such as garbage collection (GC) and tiering. In an example, the size of one VCE can be 512 bytes (B), and one VCE can contain ~32 Virtuals (mapping 256 kilobytes (KB)), with 1 Virtual per File Block (8 KB). A VCE can be stored on a dedicated volume, such as a metadata (MD) "Chunk Domain."

A Chunk Descriptor 518 can comprise information about a Chunk, such as a checksum, and a backpointer to a first VCE in a chain of VCEs (Where VCE 514A, VCE 514B, and VCE 514C form a chain of VCEs by pointing to each other; and where a backpointer can generally comprise a pointer from one data structure to another data structure that is at a higher abstraction level). A Chunk Descriptor can be stored on a dedicated MD "Chunk Domain." A conversion between a Chunk address and a Chunk Descriptor address can be defined. In an example, a Chunk Descriptor can have a size of 64 B.

A leaf 510 of an inode Mapping Tree Pointer can comprise a pointer to a Virtual (e.g., virtual pointer 512, which can point to a particular VCE, and a virtual index within that VCE).

Figure 6:
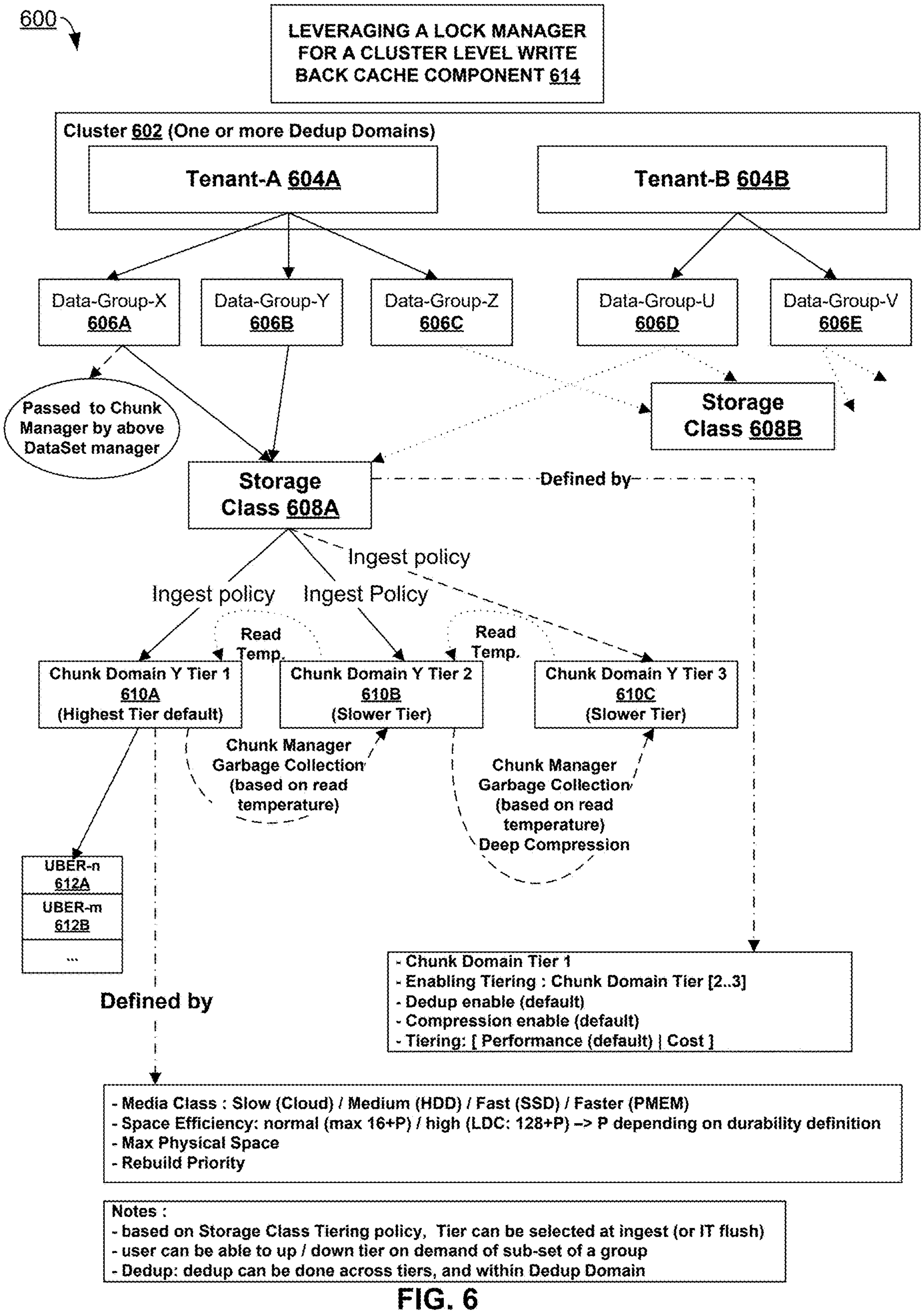
FIG. 6 illustrates another example system architecture of chunk domains in a storage cluster, and that can facilitate utilizing a lock manager for a cluster-level write back cache, in accordance with an embodiment of this disclosure.

FIG. 6 illustrates another example system architecture 600 of chunk domains in a storage cluster, and that can facilitate utilizing a lock manager for a cluster-level write back cache, in accordance with an embodiment of this disclosure. In some examples, part(s) of system architecture 600 can be used by system architecture 100 of FIG. 1 to facilitate utilizing a lock manager for a cluster-level write back cache.

System architecture 600 depicts scale-out NAS storage, which can comprise tenants, data sets (data group), tiering, and/or dedup using a ChunkStore.

System architecture 600 comprises cluster 602, tenant-A 604A, tenant-B 604B, data-group-X 606A, data-group-Y 606B, data-group-Z 606C, data-group-U 606D, data-group-V 606E, storage class 608A, storage class 608B, chunk domain Y tier 1 610A, chunk domain Y tier 2 610B, chunk domain Y tier 3 610C, uber-n 612A, uber-m 612B, and utilizing a lock manager for a cluster-level write back cache component 614 (which can be similar to utilizing a lock manager for a cluster-level write back cache component 108 of FIG. 1).

A Dataset defines policies to apply on a set of data. Policies can include quota/snap/replication/tiering policies (and more). From the ChunkManager's perspective, it can be that only a sub-set of policies applied automatically, like tiering. Moreover, a ChunkManager can provide the mapping and metadata architecture to support dedup (deduplication) at a dedup domain level and/or software encryption of the group of data.

It can be that a ChunkManager is not aware of a Dataset. However, the ChunkManager can track in its metadata a "data group," to be able apply a policy or policy changes on tiering, dedup domain, or another policy that can be defined on a group of data. Above the ChunkManager, a mapping of Dataset to Data-group (e.g., data-group-X 606A) can exist, and writes to the ChunkManager can be tagged with the data-group ID.

Figure 7:
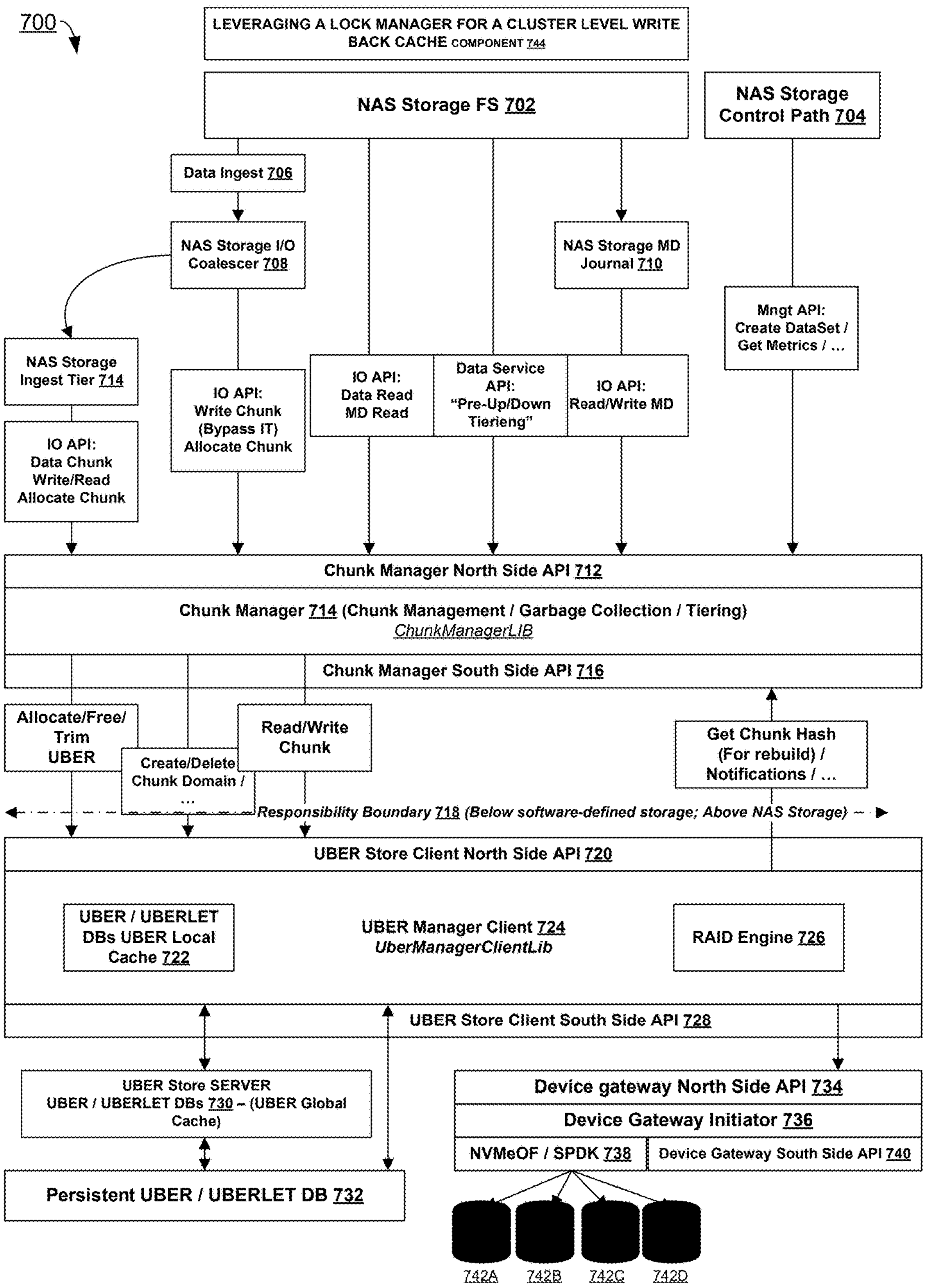
FIG. 7 illustrates another example system architecture of a chunk domain in a storage cluster, and that can facilitate utilizing a lock manager for a cluster-level write back cache, in accordance with an embodiment of this disclosure.

FIG. 7 illustrates another example system architecture 700 of a chunk domain in a storage cluster, and that can facilitate utilizing a lock manager for a cluster-level write back cache, in accordance with an embodiment of this disclosure. In some examples, part(s) of system architecture 700 can be used by system architecture 100 of FIG. 1 to facilitate utilizing a lock manager for a cluster-level write back cache.

System architecture 700 illustrates a position of a ChunkManager in a data path.

System architecture 700 comprises NAS storage filesystem (FS) 702, NAS storage control path 704, NAS storage ingest tier 706, NAS storage I/O coalesce 708, NAS storage MD journal 710, chunkmanager north side API 712, chunkmanager 714, chunkmanager south side API 716, responsibility boundary 718, uberstore client north side API 720, uber manager client 722, uberstore client south side API 724, uber/uberlet DBs uber local cache 726, RAID engine 728, uberstore server uber/uberlet DBs 730, MDM 732, device gateway north side API 734, device gateway initiator 736, NVMe over fabric (OF)/storage performance development kit (SPDK) 738 (which can generally extend a NVMe device's block storage protocol over a storage network fabric), device gateway southside API 740, drive 742A, drive 742B, drive 742C, drive 742D, and utilizing a lock manager for a cluster-level write back cache component 744 (which can be similar to utilizing a lock manager for a cluster-level write back cache component 108 of FIG. 1).

The ChunkManager 714 can be part of the data path seating between inode low level of scale-out NAS storage data path (DP), and a ChunkStore Uberstore layer.

Example Signal Flows

Figure 8:
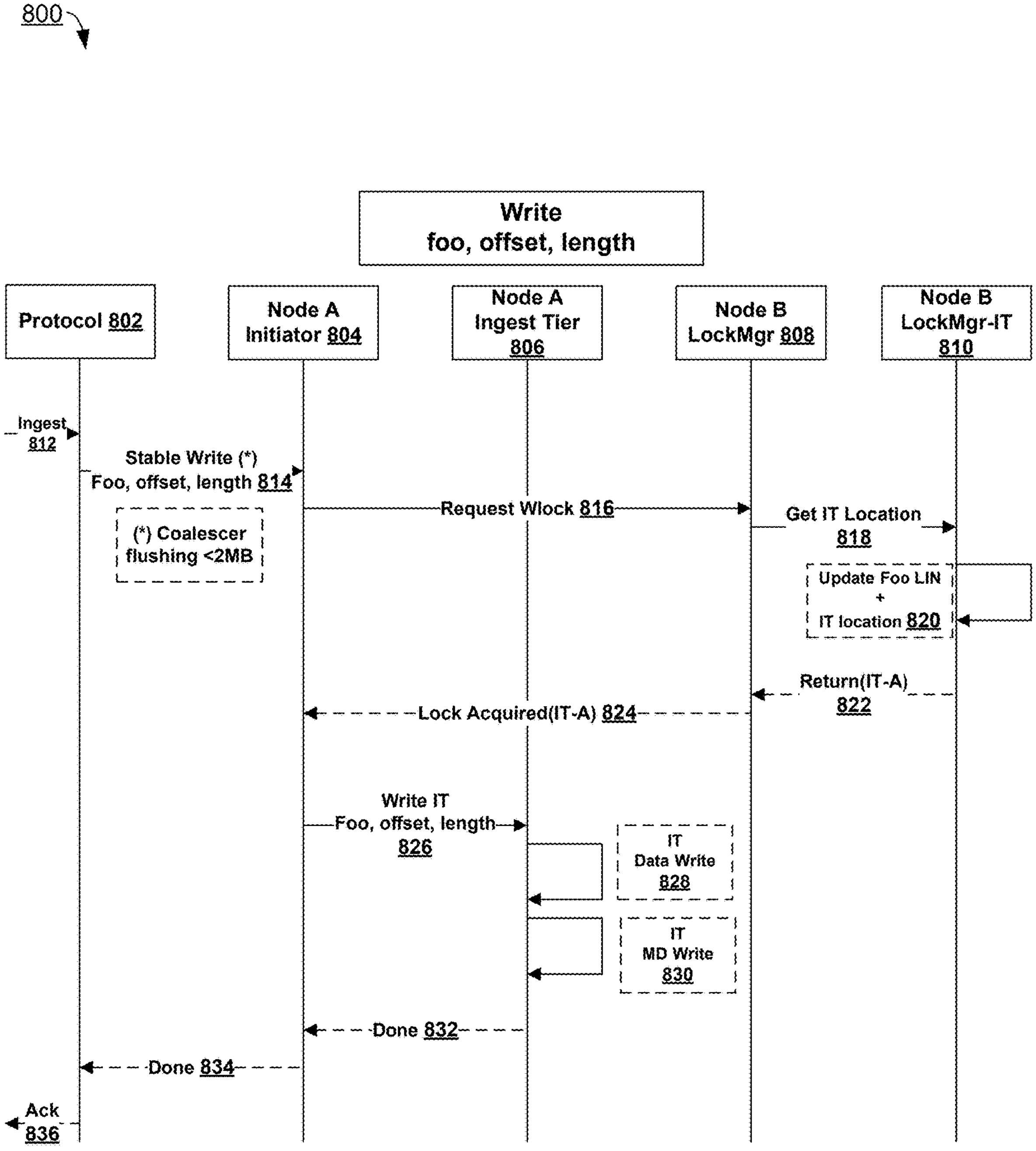
FIG. 8 illustrates an example signal flow for a write, and that can facilitate utilizing a lock manager for a cluster-level write back cache, in accordance with an embodiment of this disclosure.

FIG. 8 illustrates an example signal flow 800 for a write, and that can facilitate utilizing a lock manager for a cluster-level write back cache, in accordance with an embodiment of this disclosure. In some examples, part(s) of signal flow 800 can be used by system architecture 100 of FIG. 1 to facilitate utilizing a lock manager for a cluster-level write back cache.

The signals of signal flow 800 occur between protocol 802, node A initiator 804, node A ingest tier 806, node B lockMgr 808, and node B lockMgr-IT 810.

The signals of signal flow 800 are:

Ingest 812;
Stable write (Foo, offset, length) 814;
Request Wlock 816;
Get ingest tier (IT) location 818;
Update Foo LIN and IT location 820;
Return(IT-A) 822;
Lock acquired(IT-A) 824;
Write IT (Foo, offset, length) 826;
IT data write 828;
IT MD write 830;
Done 832;
Done 834; and
Ack 836.

Figure 9:
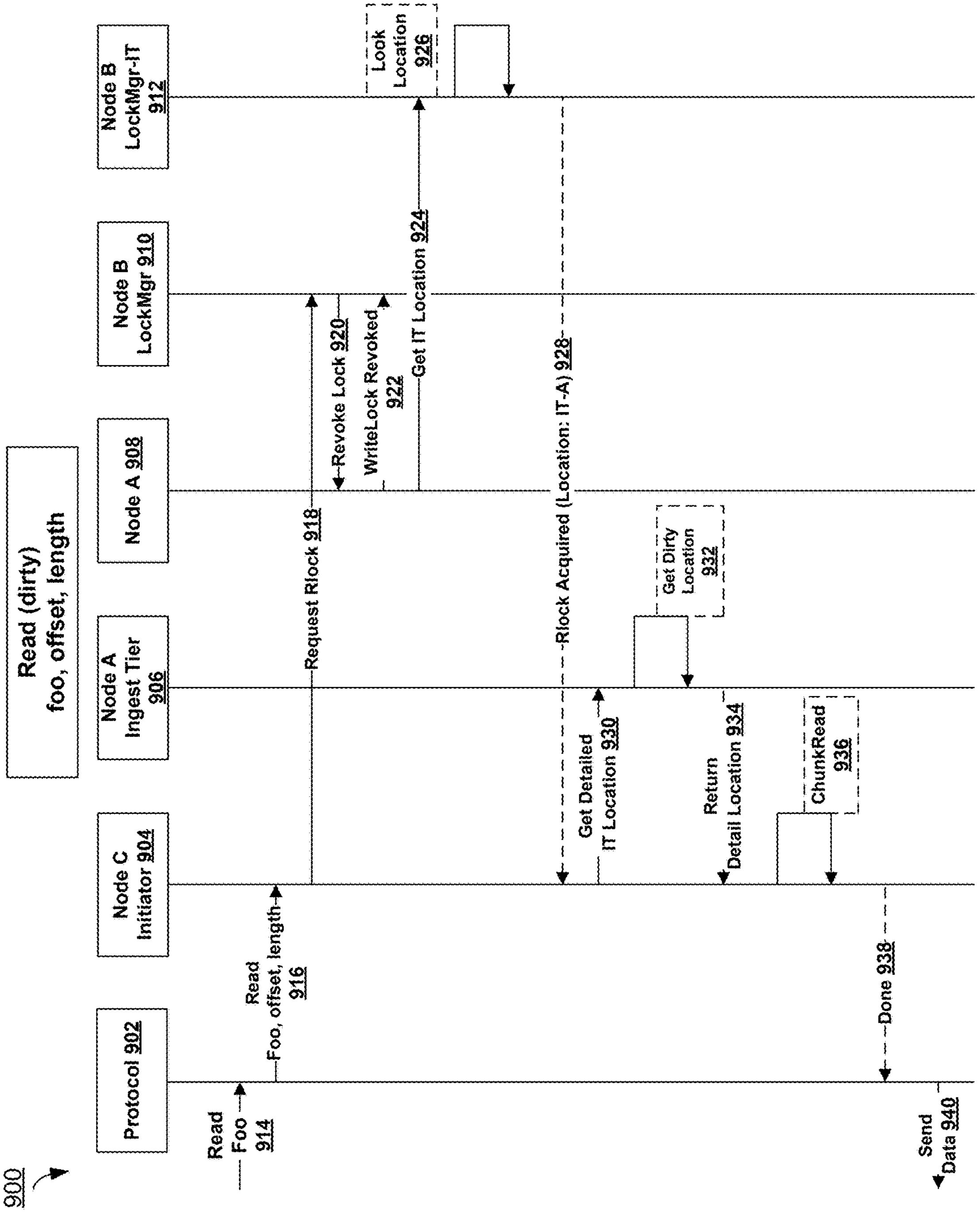
FIG. 9 illustrates an example signal flow for a read, and that can facilitate utilizing a lock manager for a cluster-level write back cache, in accordance with an embodiment of this disclosure.

FIG. 9 illustrates an example signal flow 900 for a read, and that can facilitate utilizing a lock manager for a cluster-level write back cache, in accordance with an embodiment of this disclosure. In some examples, part(s) of signal flow 900 can be used by system architecture 100 of FIG. 1 to facilitate utilizing a lock manager for a cluster-level write back cache.

The signals of signal flow 900 occur between protocol 902, node C initiator 904, node A ingest tier 906, node A 908, node B lockMgr 910, and node B lockMgr-IT 912.

The signals of signal flow 900 are:

Read Foo 914;
Read (Foo, offset, length) 916;
Request Rlock 918;
Revoke lock 920;
WriteLock revoked 922;
Get IT location 924;
Look location 926;
Rlook acquired (location: IT-A) 928;
Get detailed IT location 930;
Get dirty location 932;
Return detail location 934;
ChunkRead 936;
Done 938; and
Send data 940.

Example Process Flows

FIG. 10 illustrates an example process flow 1000 that can facilitate utilizing a lock manager for a cluster-level write back cache, in accordance with an embodiment of this disclosure. In some examples, one or more embodiments of process flow 1000 can be implemented by utilizing a lock manager for a cluster-level write back cache component 108 of FIG. 1, or computing environment 1000 of FIG. 10.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1100 of FIG. 11, and/or process flow 1200 of FIG. 12.

Process flow 1000 begins with 1002, and moves to operation 1004.

Operation 1004 depicts maintaining a filesystem across nodes of a cluster, where respective nodes of the nodes are configured to read and write on any other node of the nodes. This can be a cluster filesystem, similar to as described with respect to FIG. 1.

After operation 1004, process flow 1000 moves to operation 1006.

Operation 1006 depicts, based on receiving a first request from a first node of the nodes to ingest data or to write the data to a location on a second node of the nodes, issuing, by a lock manager and to the first node, a write lock on the location of the second node. This can be implemented in a similar manner as request Wlock 816 through lock acquired (IT-A) 824 of FIG. 8

After operation 1006, process flow 1000 moves to operation 1008.

Operation 1008 depicts, based on the first node receiving the write lock, writing, by the first node, the data to a write back cache of the first node while refraining from writing the data to the location on the second node. This can be implemented in a similar manner as write IT foo, offset, length 826 of FIG. 8.

After operation 1008, process flow 1000 moves to operation 1010.

Operation 1010 depicts, before the first node flushes the write back cache, comprising writing the data to the location of the second node, responding, by the lock manager, to a second request to read the location on the second node with a read lock that indicates reading the data in the write back cache on the first node. This can be implemented in a similar manner as 928-934 of FIG. 9.

In some examples, operation 1010 comprises, after the first node flushes the write back cache, responding, by the lock manager, to a third request to read the location on the second node with a second read lock that indicates reading the data at the location on the second node. That is, when the written data has been flushed from a write back cache to the location on the node that it is to be written to, the lock manager can direct read requests to that location on the node rather than to a write back cache.

In some examples, the write lock is a first write lock, and the first node flushing the write back cache comprises the first node acquiring a second write lock from the lock manager for the location on the second node. That is, flushing a write back cache can comprise writing data, and a write lock can be acquired to effectuate this.

In some examples, the data is first data, the write lock is a first write lock, the write back cache is a first write back cache, and operation 1010 comprises, after the writing of the data to the first write back cache of the first node and before the first node flushes the first write back cache, based on the lock manager receiving a third request from a third node of the nodes to write second data to the location on the second node, issuing a second write lock to the third node, wherein the third node writes the second data to a second write back cache of the third node while refraining from writing the second data to the location on the second node. That is, multiple nodes can receive write locks to write to the same location on another node, and they can each write to their own local write back cache (which can later be flushed to the location on the other node).

Inn some examples, operation 1010 comprises storing, by the lock manager, an indication that the second write back cache stores valid data for the location on the second node. That is, where data can be stored in various write back caches of various nodes before it is flushed to a location that it is intended to be written to, the lock manager can keep track of where the valid data for that location is being stored (e.g., in a particular write back cache).

In some examples, operation 1010 comprises, before the third node flushes the second write back cache, responding, by the lock manager and based on the indication that the second write back cache stores the valid data for the location on the second node, to a fourth request to read the location on the second node with a third read lock that indicates reading the data in the second write back cache on the third node. That is, where multiple nodes have written to the same location via respective write back caches, when a most-recent write is still stored in a write back cache rather than the intended location, a read request can be directed to that write back cache.

In some examples, operation 1010 comprises responding, by the lock manager, to a fourth request by the first node to flush the first data in the first write back cache to the location on the second node with a rejection of at least a portion the first data that corresponds to a dirty region. In some examples, the rejection indicates an obsolete status of the first data in the first write back cache. That is, the first node can store data in its write back cache that can become invalid because another node wrote to the location on the second node. So, rather than letting the first node flush invalid data to the location on the second node, the lock manager can reject this request.

With regarding to rejecting at least a portion the first data that corresponds to a dirty region, it can be that the flush corresponds to a first flush to part of a dirty region and a second flush to part of a clean region. The flush can be rejected for the part that overlaps with the dirty region, and be accepted for the rest of the range.

After operation 1010, process flow 1000 moves to 1012, where process flow 1000 ends.

FIG. 11 illustrates another example process flow 1100 that can facilitate utilizing a lock manager for a cluster-level write back cache, in accordance with an embodiment of this disclosure. In some examples, one or more embodiments of process flow 1100 can be implemented by utilizing a lock manager for a cluster-level write back cache component 108 of FIG. 1, or computing environment 1000 of FIG. 10.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts based on receiving, by a lock manager, a first request from a first node of a cluster filesystem to ingest data or to write the data to a location on a second node of the cluster filesystem, issuing, to the first node, a write lock on the location of the second node. In some examples, operation 1104 can be implemented in a similar manner as operations 1004-1006 of FIG. 10.

In some examples, the location comprises an offset of a data storage area of the second node, and a data length of a part of the data storage area to lock. That is, when data is written on a node, an offset/length write range lock can be acquired via a lock manager.

In some examples, the location comprises an indication of a logical inode. In filesystems that store data with inodes, a logical inode can comprise a data structure that stores information about data, such as a file.

In some examples, the lock manager executes on a third node of the cluster filesystem. That is, the lock manager can exist on a node different from the node that is writing, or the node that is the target of the writing.

After operation 1104, process flow 1100 moves to operation 1106.

Operation 1106 depicts, based on the first node receiving the write lock, writing, by the first node, the data to a write back cache of the first node while refraining from writing the data to the location on the second node. In some examples, operation 1106 can be implemented in a similar manner as operation 1008 of FIG. 10.

In some examples, the writing, by the first node, of the data to the write back cache of the first node comprises writing metadata of the data to the write back cache. This can be implemented in a similar manner as 830 of FIG. 3.

After operation 1106, process flow 1100 moves to operation 1108.

Operation 1108 depicts, before the first node flushes the write back cache, comprising writing the data to the location of the second node, responding, by the lock manager, to a second request to read the location on the second node with a read lock that indicates reading the data in the write back cache on the first node. In some examples, operation 1108 can be implemented in a similar manner as operation 1010 of FIG. 10.

In some examples, the responding to the second request with the read lock comprises revoking the write lock from the first node. In some examples, the revoking of the write lock occurs before the responding to the second request with the read lock. This can be implemented in a similar manner as 918-928 of FIG. 9.

After operation 1108, process flow 1100 moves to 1110, where process flow 1100 ends.

FIG. 12 illustrates another example process flow 1200 that can facilitate utilizing a lock manager for a cluster-level write back cache, in accordance with an embodiment of this disclosure. In some examples, one or more embodiments of process flow 1200 can be implemented by utilizing a lock manager for a cluster-level write back cache component 108 of FIG. 1, or computing environment 1000 of FIG. 10.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11.

Process flow 1200 begins with 1202, and moves to operation 1204.

Operation 1204 depicts, based on receiving, by a lock manager of a cluster filesystem, a first request from a first node of the cluster filesystem to ingest data or to write the data to a location on a second node of the cluster filesystem, issuing, to the first node, a write lock on the location. In some examples, operation 1204 can be implemented in a similar manner as operations 1004-1006 of FIG. 10.

After operation 1204, process flow 1200 moves to operation 1206.

Operation 1206 depicts, based on the first node receiving the write lock, writing, by the first node, the data to a write back cache. In some examples, operation 1206 can be implemented in a similar manner as operation 1108 of FIG. 10.

After operation 1206, process flow 1200 moves to operation 1208.

Operation 1208 depicts, before the first node flushes the write back cache, responding, by the lock manager, to a second request to read the location on the second node with a read lock that indicates reading the data in the write back cache. In some examples, operation 1208 can be implemented in a similar manner as operation 1010 of FIG. 10.

In some examples, the read lock is a first read lock, and operation 1208 comprises, after the first node flushes the write back cache, responding, by the lock manager, to a third request to read the location on the second node with an indication to read the data at the location on the second node.

In some examples, the data is first data, the write lock is a first write lock, the write back cache is a first write back cache, and operation 1208 comprises, after the writing of the data to the first write back cache and before the first node flushes the first write back cache, based on the lock manager receiving a third request from a third node of the cluster filesystem to write second data to the location, issuing a second write lock to the third node, wherein the third node writes the second data to a second write back cache of the third node while refraining from writing the second data to the location.

In some examples, operation 1208 comprises maintaining, by the lock manager, an indication that the second write back cache stores valid data for the location on the second node.

In some examples, the indication is a first indication, and operation 1208 comprises, before the third node flushes the second write back cache, responding, by the lock manager, to a fourth request to read the location on the second node with a second indication to read the data in the second write back cache.

After operation 1208, process flow 1200 moves to 1210, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of computer system 102 and/or remote computer 106.

In some examples, computing environment 1300 can implement one or more embodiments of the process flows of FIGS. 10-12 to facilitate utilizing a lock manager for a cluster-level write back cache.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

maintaining a filesystem across nodes of a cluster, where respective nodes of the nodes are configured to read and write on any other node of the nodes;

based on receiving a first request from a first node of the nodes to ingest data or to write the data to a location on a second node of the nodes, issuing, by a lock manager and to the first node, a write lock on the location of the second node;

based on the first node receiving the write lock, writing, by the first node, the data to a write back cache of the first node while refraining from writing the data to the location on the second node; and before the first node flushes the write back cache, comprising writing the data to the location of the second node, responding, by the lock manager, to a second request to read the location on the second node with a read lock that indicates reading the data in the write back cache on the first node.

2. The system of claim 1, wherein the read lock is a first read lock, and wherein the operations further comprise:

after the first node flushes the write back cache, responding, by the lock manager, to a third request to read the location on the second node with a second read lock that indicates reading the data at the location on the second node.

3. The system of claim 2, wherein the write lock is a first write lock, and wherein the first node flushing the write back cache comprises the first node acquiring a second write lock from the lock manager for the location on the second node.

4. The system of claim 1, wherein the data is first data, wherein the write lock is a first write lock, wherein the write back cache is a first write back cache, and wherein the operations further comprise:

after the writing of the data to the first write back cache of the first node and before the first node flushes the first write back cache, based on the lock manager receiving a third request from a third node of the nodes to write second data to the location on the second node, issuing a second write lock to the third node, wherein the third node writes the second data to a second write back cache of the third node while refraining from writing the second data to the location on the second node.

5. The system of claim 4, wherein the operations further comprise:

storing, by the lock manager, an indication that the second write back cache stores valid data for the location on the second node.

6. The system of claim 5, wherein the operations further comprise:

before the third node flushes the second write back cache, responding, by the lock manager and based on the indication that the second write back cache stores the valid data for the location on the second node, to a fourth request to read the location on the second node with a third read lock that indicates reading the data in the second write back cache on the third node.

7. The system of claim 5, wherein the operations further comprise:

responding, by the lock manager, to a fourth request by the first node to flush the first data in the first write back cache to the location on the second node with a rejection of at least a portion the first data that corresponds to a dirty region.

8. The system of claim 7, wherein the rejection indicates an obsolete status of the first data in the first write back cache.

9. A non-transitory computer-readable medium comprising instructions that, in response to execution, cause a system comprising at least one processor to perform operations, comprising:

based on receiving, by a lock manager of a cluster filesystem, a first request from a first node of the cluster filesystem to ingest data or to write the data to a location on a second node of the cluster filesystem, issuing, to the first node, a write lock on the location;

based on the first node receiving the write lock, writing, by the first node, the data to a write back cache; and before the first node flushes the write back cache, responding, by the lock manager, to a second request to read the location on the second node with a read lock that indicates reading the data in the write back cache.

10. The non-transitory computer-readable medium of claim 9, wherein the read lock is a first read lock, and wherein the operations further comprise:

after the first node flushes the write back cache, responding, by the lock manager, to a third request to read the location on the second node with an indication to read the data at the location on the second node.

11. The non-transitory computer-readable medium of claim 9, wherein the data is first data, wherein the write lock is a first write lock, wherein the write back cache is a first write back cache, and wherein the operations further comprise:

after the writing of the data to the first write back cache and before the first node flushes the first write back cache, based on the lock manager receiving a third request from a third node of the cluster filesystem to write second data to the location, issuing a second write lock to the third node, wherein the third node writes the second data to a second write back cache of the third node while refraining from writing the second data to the location.

12. The non-transitory computer-readable medium of claim 11, wherein the operations further comprise:

maintaining, by the lock manager, an indication that the second write back cache stores valid data for the location on the second node.

13. The non-transitory computer-readable medium of claim 12, wherein the indication is a first indication, and wherein the operations further comprise:

before the third node flushes the second write back cache, responding, by the lock manager, to a fourth request to read the location on the second node with a second indication to read the data in the second write back cache.

* * * * *